United States Patent [19]

Kato et al.

[11] Patent Number: 5,110,701
[45] Date of Patent: May 5, 1992

[54] BINDER FOR ELECTROPHOTOGRAPHIC LIGHT-SENSITIVE MATERIAL CONTAINING RECURRING ESTER UNITS

[75] Inventors: Eiichi Kato; Kazuo Ishii, both of Haibara, Japan

[73] Assignee: Fuji Photo Film Co., Ltd., Kanagawa, Japan

[21] Appl. No.: 521,956

[22] Filed: May 11, 1990

[30] Foreign Application Priority Data

May 12, 1989 [JP] Japan ................................. 1-117536
May 19, 1989 [JP] Japan ................................. 1-124550

[51] Int. Cl.$^5$ ............................................. G03G 5/08
[52] U.S. Cl. .......................................... 430/96; 430/84
[58] Field of Search ................................. 430/96, 84

[56] References Cited

U.S. PATENT DOCUMENTS

| | | | |
|---|---|---|---|
| 4,828,952 | 5/1989 | Kato et al. | 430/96 |
| 4,910,112 | 3/1990 | Kato et al. | 430/96 |
| 5,009,975 | 4/1991 | Kato et al. | 430/96 |

Primary Examiner—John Goodrow
Attorney, Agent, or Firm—Sughrue, Mion, Zinn, Macpeak & Seas

[57] ABSTRACT

An electrophotograhic light-sensitive material comprising a support having thereon a photoconductive layer containing at least inorganic photoconductive particles and a binder resin is disclosed, wherein the binder resin contains (A) at least one resin comprising a graft copolymer having a weight average molecular weight of from $1.0 \times 10^3$ to $2.0 \times 10^4$ and containing, as a copolymer component, at least one of polyester type macromonomers having a weight average molecular weight of from $1.0 \times 10^3$ to $1.5 \times 10^4$.

8 Claims, No Drawings

BINDER FOR ELECTROPHOTOGRAPHIC LIGHT-SENSITIVE MATERIAL CONTAINING RECURRING ESTER UNITS

FIELD OF THE INVENTION

This invention relates to an electrophotographic light-sensitive material, and more particularly to an electrophotographic light-sensitive material having excellent electrostatic characteristics, moisture resistance, and durability.

BACKGROUND OF THE INVENTION

An electrophotographic light-sensitive material may have various structures depending on the characteristics required or an electrophotographic process to be employed.

An electrophotographic system in which the light-sensitive material comprises a support having thereon at least one photoconductive layer and, if necessary, an insulating layer on the surface thereof is widely employed. The electrophotographic light-sensitive material comprising a support and at least one photoconductive layer formed thereon is used for image formation by an ordinary electrophotographic process including electrostatic charging, imagewise exposure, development, and, if desired, transfer.

Further, a process using an electrophotographic light-sensitive material as an offset master plate precursor for direct plate making is widely practiced.

Binders which are used for forming the photoconductive layer of an electrophotographic light-sensitive material are required to have film-forming properties by themselves and the capability of dispersing a photoconductive powder therein. Also, the photoconductive layer formed using the binder should have satisfactory adhesion to a base material or support. The photoconductive layer formed by using the binder also must have various electrostatic characteristics and image-forming properties, such that the photoconductive layer exhibits high charging capacity, small dark decay and large light decay, hardly undergoes fatigue before exposure, and maintains these characteristics in a stable manner against change of humidity at the time of image formation.

Binder resins which have been conventionally used include silicone resins (see JP-B-34-6670, the term "JP-B" as used herein means an "examined published Japanese patent Publication"), styrene-butadiene resins (see JP-B-35-1960), alkyd resins, maleic acid resins, and polyamide (see JP-B-35-11219), vinyl acetate resins (see JP-B-41-2425), vinyl acetate copolymer resins (see JP-B-41-2426), acrylic resins (see JP-B-35-11216), acrylic ester copolymer resins (see JP-B-35-11219, JP-B-36-8510, and JP-B-41-13946), etc. However, electrophotographic light-sensitive materials using these known resins have a number of disadvantages, i.e., poor affinity for a photoconductive powder (poor dispersion of a photoconductive coating composition); low photoconductive layer charging properties; poor reproduced image quality, particularly dot reproducibility or resolving power; susceptibility of the reproduced image quality to influences from the environment at the time of electrophotographic image formation, such as high temperature and high humidity conditions or low temperature and low humidity conditions; and insufficient film strength or adhesion of the photoconductive layer, which causes, when the light-sensitive material is used for an offset master, peeling of the photoconductive layer during offset printing thus failing to obtain a large number of prints; and the like.

To improve the electrostatic characteristics of a photoconductive layer, various approaches have hitherto been taken. For example, incorporation of a compound containing an aromatic ring or furan ring containing a carboxyl group or nitro group either alone or in combination with a dicarboxylic acid anhydride into a photoconductive layer has been proposed as disclosed in JP-B-42-6878 and JP-B-45-3073. However, the thus improved electrophotographic light-sensitive materials still have insufficient electrostatic characteristics, particularly light decay characteristics. The insufficient sensitivity of these light-sensitive materials has been compensated for by incorporating a large quantity of a sensitizing dye into the photoconductive layer. However, light-sensitive materials containing a large quantity of a sensitizing dye undergo considerable deterioration of whiteness to reduce the quality as a recording medium, sometimes causing a deterioration in dark decay characteristics, resulting in a failure to obtain a satisfactory reproduced image.

On the other hand, JP-A-60-10254 (the term "JP-A" as used herein means an "unexamined published Japanese patent application") suggests control of the average molecular weight of a resin to be used as a binder of the photoconductive layer. According to this suggestion, the combined use of an acrylic resin having an acid value of from 4 to 50 and an average molecular weight of from $1 \times 10^3$ to $1 \times 10^4$ and an acrylic resin having an acid value of from 4 to 50 and an average molecular weight of from $1 \times 10^4$ to $2 \times 10^5$ would improve the electrostatic characteristics (particularly reproducibility as a PPC light-sensitive material on repeated use), moisture resistance, and the like.

In the field of lithographic printing plate precursors, extensive studies have been conducted to provide binder resins for a photoconductive layer having electrostatic characteristics compatible with printing characteristics. Examples of binder resins so far reported to be effective for oil-desensitization of a photoconductive layer include a resin having a molecular weight of from $1.8 \times 10^4$ to $10 \times 10^4$ and a glass transition point of from 10° C. to 80° C. obtained by copolymerizing a (meth)acrylate monomer and a copolymerizable monomer in the presence of fumaric acid in combination with a copolymer of a (meth)acrylate monomer and a copolymerizable monomer other than fumaric acid as disclosed in JP-B-50-31011; a terpolymer containing a (meth)acrylic ester unit with a substituent having a carboxyl group at least 7 atoms distant from the ester linkage as disclosed in JP-A-53-54027; a tetra- or pentapolymer containing an acrylic acid unit and a hydroxyethyl (meth)acrylate unit as disclosed in JP-A-54-20735 and JP-A-57-202544; and a terpolymer containing a (meth)acrylic ester unit with an alkyl group having from 6 to 12 carbon atoms as a substituent and a vinyl monomer containing a carboxyl group as disclosed in JP-A-58-68046.

However, none of these resins proposed has proved to be satisfactory for practical use in charging properties, dark charge retention, photosensitivity, and surface smoothness of the photoconductive layer.

The binder resins proposed for use in electrophotographic lithographic printing plate precursors were also proved by actual evaluations to give rise to problems relating to electrostatic characteristics and background staining of prints.

In order to solve these problems, it has been proposed to use, as a binder resin, a low-molecular weight resin (molecular weight: $1\times 10^3$ to $1\times 10^4$) containing from 0.05 to 10% by weight of a copolymer component having an acid group in the side chain thereof to thereby improve surface smoothness and electrostatic characteristics of the photoconductive layer and to obtain background stain-free images as disclosed in JP-A-63-217354. It has also been proposed to use such a low-molecular weight resin in combination with a high-molecular weight resin (molecular weight: $1\times 10^4$ or more) to thereby obtain sufficient film strength of the photoconductive layer to improve printing durability without impairing the above-described favorable characteristics as disclosed in Japanese Patent Application No. 63-49817, JP-A-63-220148 and JP-A-63-220149.

It has turned out, however, that use of these resins is still insufficient for stably maintaining performance properties in cases when the environmental conditions greatly change from high-temperature and high-humidity conditions to low-temperature and low-humidity conditions. In particular, in a scanning exposure system using a semi-conductor laser beam, the exposure time becomes longer and also there is a restriction on the exposure intensity as compared to a conventional overall simultaneous exposure system using a visible light and, hence, higher performance with respect to electrostatic characteristics, and particularly dark charge retention and photosensitivity has been demanded.

SUMMARY OF THE INVENTION

An object of this invention is to provide an electrophotographic light-sensitive material having stable and excellent electrostatic characteristics and providing clear images of high quality unaffected by variations in environmental conditions at the time of reproduction of an image, such as a change to low-temperature and low-humidity conditions or to high-temperature and high-humidity conditions.

Another object of this invention is to provide a CPC electrophotographic light-sensitive material having excellent electrostatic characteristics with small changes due to environmental changes.

A further object of this invention is to provide an electrophotographic light-sensitive material effective for a scanning exposure system using a semi-conductor laser beam.

A still further object of this invention is to provide an electrophotographic lithographic printing plate precursor having excellent electrostatic characteristics (particularly dark charge retention and photosensitivity), capable of providing a reproduced image having high fidelity to an original, causing neither overall background stains nor dotted background stains of prints, and having excellent printing durability.

It has now been found that the above objects of this invention are accomplished by an electrophotographic light-sensitive material comprising a support having thereon a photoconductive layer containing at least inorganic photoconductive particles and a binder resin, wherein the binder resin contains (A) at least one resin comprising a graft copolymer having a weight average molecular weight of from $1.0\times 10^3$ to $2.0\times 10^4$ and containing, as a copolymer component, at least one of polyester type macromonomers having a weight average molecular weight of from $1.0\times 10^3$ to $1.5\times 10^4$ and represented by following formulae (I), (II), (II), and (IV):

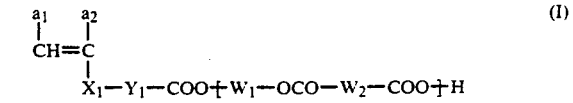

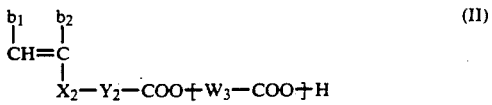

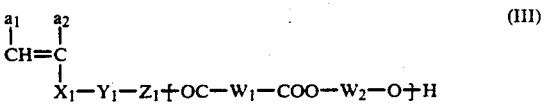

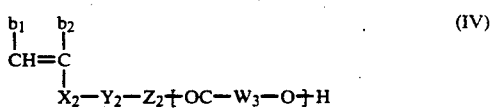

wherein the brackets [ ] represent a recurring unit; $a_1$ and $a_2$, which may be the same or different, each represents a hydrogen atom, a halogen atom, a cyano group, a hydrocarbon group having from 1 to 8 carbon atoms, —COO—Z, or —COO—Z bonded through a hydrocarbon group having from 1 to 8 carbon atoms (wherein Z represents a hydrocarbon group having from 1 to 18 carbon atoms); $X_1$ represents a bond, —COO—, —OCO—,

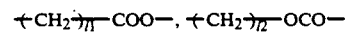

(wherein $l_1$ and $l_2$ each represents an integer of from 1 to 3),

(wherein $P_1$ represents a hydrogen atom or a hydrocarbon group having from 1 to 12 carbon atoms), —CONHCONH—, —CONHCOO—, —O—,

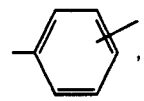

or —SO$_2$—; $Y_1$ represents a bond or a group linking $X_1$ and —COO— or a group linking $X_1$ and $Z_1$; $Z_1$ represents a bond or —CH$_2$—, —O—, or —NH—; $W_1$ and $W_2$, which may be the same or different, each represents a divalent aliphatic group, a divalent aromatic group (each of the aforesaid groups may have in the bond of the divalent organic residue at least one bond group selected from —O—, —S—,

(wherein $P_2$ represents a hydrogen atom or a hydrocarbon group having from 1 to 12 carbon atoms), —SO$_2$—, —COO—, —OCO—, —CONHCO—, —NHCONH—,

(wherein P₃ has the same meaning as P₂),

(wherein P₄ has the same meaning as P₂), and

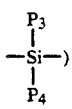

or an organic residue composed of a combination of these residues; $W_3$ represents a divalent aliphatic group; $b_1$ and $b_2$ have the same meaning as $a_1$ and $a_2$; $X_2$ has the same meaning as $X_2$; $Y_2$ has the same meaning as $Y_1$; and $Z_2$ has the same meaning as $Z_1$;

and (B) at least one resin having a weight average molecular weight of $5 \times 10^4$ or more, containing a recurring unit represented by the following formula (VI) as a copolymer component, and having a crosslinked structure:

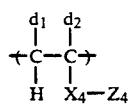 (VI)

wherein $X_4$ represents —COO—, —OCO—, —CH$_2$OCO—, —CH$_2$COO—, —O—, or —SO$_2$—; $Z_4$ represents a hydrocarbon group having from 1 to 22 carbon atoms; and $d_1$ and $d_2$, which may be the same or different, each represents a hydrogen atom, a halogen atom, a cyano group, a hydrocarbon group having from 1 to 8 carbon atoms, —COO—Z', or —COO—Z' bonded through a hydrocarbon group having from 1 to 8 carbon atoms, wherein Z' represents a hydrocarbon group having from 1 to 18 carbon atoms.

That is, the binder resin which can be used in the present invention comprises at least a low-molecular weight graft copolymer containing, as a copolymer component, a polyester type macromonomer having a polymerizable double bond group at one end thereof and a carboxyl group or a hydroxyl group at the other end (hereinafter referred to as resin (A)) and a high-molecular weight resin having a crosslinked structure at least in parts (hereinafter referred to as resin (B)).

In a preferred embodiment of the present invention, resin (A) is a resin in which the graft copolymer has at least one polar group selected from the group consisting of —PO₃H₂, —SO₃H, —COOH, —OH,

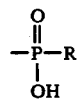

(wherein R represents a hydrocarbon group or —OR₀, wherein R₀ represents a hydrocarbon group), and a cyclic acid anhydride group-containing group at one terminal of the main chain thereof (hereinafter sometimes referred to as resin (A')).

In another preferred embodiment of the present invention, resin (B) is a resin in which at least one polymer main chain has at least one polar group selected from the group consisting of —PO₃H₂, —SO₃H, —COOH, —OH, —SH,

(wherein R' represents a hydrocarbon group or —OR₀', wherein R₀' represents a hydrocarbon group), a cyclic acid anhydride group-containing group, —CHO, —CONH₂, —SO₂NH₂, and

(wherein $g_1$ and $g_2$, which may be the same or different, each represents a hydrogen atom or a hydrocarbon group) at one terminal thereof (hereinafter sometimes referred to as resin (B')).

In a still another embodiment of the present invention, particularly when resin (A) contains the above-described polar group at the terminal thereof, resin (B) preferably contains, as a polymer component, no recurring unit having the acidic group or cyclic acid anhydride-containing group as enumerated with respect to resin (A').

DETAILED DESCRIPTION OF THE INVENTION

As described above, conventional acidic group-containing binder resins have been developed chiefly for use in offset master plates and, hence, have a high molecular weight (e.g., $5 \times 10^4$ or even more) so as to assure film strength sufficient for improving printing durability. Moreover, these known copolymers are random copolymers in which the acidic group-containing copolymer component is randomly present in the polymer main chain thereof.

To the contrary, resin (A) of the present invention is a graft copolymer, in which the acidic group is not randomized in the main chain thereof but bonded at a specific position(s), i.e., at the terminal of the grafted portion or, in addition, at the terminal of the main chain thereof.

Accordingly, it is assumed that the hydroxyl group or acidic group moiety existing at a specific position apart from the main chain of the copolymer is adsorbed onto stoichiometric defects of inorganic photoconductive particles, while the main chain portion of the copolymer mildly and sufficiently cover the surface of the photoconductive particles. Thus, electron traps of the photoconductive particles can be compensated for and humidity resistance can be improved, while aiding sufficient dispersion of the photoconductive particles without agglomeration. Resin (B) serves to sufficiently increase mechanical strength of the photoconductive layer which is insufficient in case of using resin (A) alone, without impairing the excellent electrophotographic characteristics obtained by using resin (A).

The photoconductive layer obtained by the present invention has improved surface smoothness. If a light-sensitive material to be used as a lithographic printing plate precursor is prepared from a non-uniform dispersion of photoconductive particles in a binder resin with agglomerates being present, the photoconductive layer has a rough surface. As a result, non-image areas cannot be rendered uniformly hydrophilic by oil-desensitization treatment with an oil-desensitizing solution. This being the case, the resulting printing plate induces adhesion of a printing ink to the non-image areas on printing, which phenomenon leads to background stains in the non-image areas of prints.

It was also confirmed that the resin binder of the present invention exhibits satisfactory photosensitivity as compared with random copolymer resins containing a polar group or an acidic group in the side chain bonded to the main chain thereof but not at the terminal of the grafted portion.

Spectral sensitizing dyes which are usually used for imparting photosensitivity in the region of from visible light to infrared light exert their full spectral sensitizing action through adsorption on photoconductive particles. From this fact, it is believed that the binder resin containing the copolymer of the present invention properly interacts with photoconductive particles without hindering the adsorption of a spectral sensitizing dye on the photoconductive particles. This action of the binder resin is particularly pronounced in using cyanine dyes or phthalocyanine pigments which are particularly effective as spectral sensitizing dyes for sensitization in the region of from near infrared to infrared.

Resin (B) is a polymer having a moderately crosslinked structure, and resin (B') is a polymer containing a polar group at only one terminal of the main chain thereof. It is thus considered that an interaction among high molecular chains and, in addition, a weak interaction between the polar group and photoconductive particles exert synergistic effects to bring about markedly excellent performance properties in electrophotographic characteristics compatible with film strength.

Where resin (B) contains a polymer component having the same polar group as that bonded to the main chain terminal of resin (A), a proportion of such a polymer component in resin (B) is 50% by weight at the most, preferably not more than 20% by weight, based on the content of the polar group-containing polymer component in resin (A). More preferably, the content of the polar group-containing polymer component in resin (B) is from 0 to 2% by weight. If it exceeds 2% by weight, dispersion of photoconductive particles is destroyed to form agglomerates or precipitates. If any coating film may be obtained from the dispersion, the resulting photoconductive layer would have seriously reduced electrostatic characteristics, or the photoconductive layer would have a rough surface and therefore suffers from deterioration of strength to mechanical abrasion.

When only the low-molecular weight resin (A) is used alone as a binder resin, it is sufficiently adsorbed onto photoconductive particles to cover the surface of the particles so that surface smoothness and electrostatic characteristics of the photoconductive layer can be improved and stain-free images can be obtained. Also, the film strength of the resulting light-sensitive material suffices for use as a CPC light-sensitive material or as an offset printing plate precursor for production of an offset printing plate to be used for obtaining around a thousand prints under limited printing conditions. However, a combined use of resin (B) achieves further improvement in mechanical film strength, which may be still insufficient when in using resin (A) alone, without impairing the functions of resin (A) at all. Therefore, the electrophotographic light-sensitive material according to the present invention has excellent electrostatic characteristics irrespective of variations in environmental conditions as well as sufficient film strength, thereby making it possible to provide an offset master plate having a printing durability amounting to 6000 or more prints even under severe printing conditions (such as under an increased printing pressure in using a large-sized printing machine).

In resin (A), the graft copolymer has a weight average molecular weight of from $1 \times 10^3$ to $2 \times 10^4$, and preferably from $3 \times 10^3$ to $1 \times 10^4$, and contains from 3 to 60% by weight, and preferably from 10 to 50% by weight, of the macromonomer unit. Where the copolymer contains a polar group at the terminal of the main chain thereof, the content of the polar group in the copolymer ranges from 0.5 to 15% by weight, and preferably from 1 to 10% by weight of said copolymer. Resin (A) preferably has a glass transition point of from $-20°$ C. to $120°$ C., and preferably from $-10°$ C. to $90°$ C.

If the molecular weight of resin (A) is less than $1 \times 10^3$, the film-forming properties of the binder are reduced, and sufficient film strength is not retained. On the other hand, if it exceeds $2 \times 10^4$, the electrophotographic characteristics, and particularly initial potential and dark decay retention, are degraded. Deteriorations of electrophotographic characteristics is particularly conspicuous in using such a high-molecular weight polymer with a polar group content exceeding 3%, resulting in considerable background staining when used as an offset master.

If the content of the polar group in resin (A) (i.e., a carboxyl group or a hydroxyl group at the terminal of the grafted portion and any polar group at the terminal of the main chain) is less than 0.5% by weight, the initial potential is too low for a sufficient image density to be obtained. If it exceeds 15% by weight, dispersibility is reduced, film smoothness and humidity resistance are reduced, and background stains are increased when the light-sensitive material is used as an offset master.

The polyester type macromonomer having a polymerizable double bond group at one terminal and a carboxy group or a hydroxyl group at the other terminal, which is a copolymer component of the graft copolymer resin, is described below.

In formulae (I) to (IV), the moiety in the brackets is a recurring unit sufficient for making the weight average molecular weight of the macromonomer (I) to (IV) fall within a range of from $1 \times 10^3$ to $1.5 \times 10^4$.

In preferred macromonomers represented by formulae (I) and (III), $a_1$ and $a_2$, which may be the same or different, each represents a hydrogen atom, a halogen atom (e.g., chlorine, bromine, and fluorine), a cyano group, an alkyl group having from 1 to 3 carbon atoms (e.g., methyl, ethyl, and propyl), —COOZ or —CH$_2$COOZ (wherein Z represents an alkyl group having from 1 to 8 carbon atoms (e.g., methyl, ethyl, propyl, butyl, pentyl, hexyl, and octyl), an aralkyl group having from 7 to 9 carbon atoms (e.g., benzyl, phenethyl, and 3-phenylpropyl), or a substituted or unsubstituted phenyl group (e.g., phenyl, tolyl, xylyl, and methoxyphenyl)).

More preferably, either one of $a_1$ and $a_2$ is a hydrogen atom.

$X_1$ preferably represents —COO—, —OCO—, —CH$_2$COO—, —CH$_2$OCO—, —CONH—, —CONHCONH—, —CONHCOO—, or

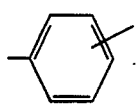

$P_1$ represents a hydrogen atom or a hydrocarbon group having from 1 to 12 carbon atoms (e.g., methyl, ethyl, propyl, butyl, hexyl, octyl, decyl, dodecyl, 2-methoxyethyl, 2-chloroethyl, 2-cyanoethyl, benzyl, methylbenzyl, chlorobenzyl, methoxybenzyl, phenethyl, phenyl, tolyl, chlorophenyl, methoxyphenyl, and butylphenyl).

$Y_1$ represents a group linking $X_1$ and —COO— or a group linking $X_1$ and $Z_1$, i.e., a bond or a linking group. Examples of suitable linking groups include

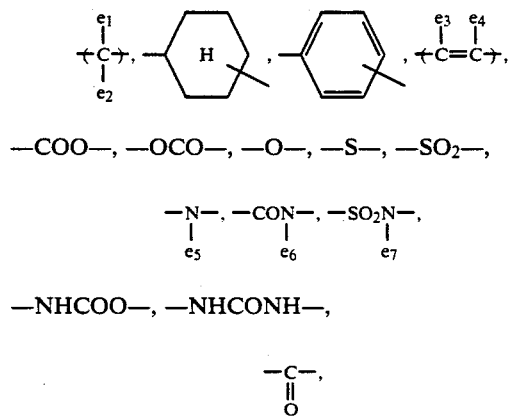

—COO—, —OCO—, —O—, —S—, —SO$_2$—, $$-\underset{e_5}{\overset{}{N}}-,\ -\underset{e_6}{\overset{}{CON}}-,\ -\underset{e_7}{\overset{}{SO_2N}}-,$$

—NHCOO—, —NHCONH—,

and a combination of these linking groups, wherein $e_1$, $e_2$, $e_3$, and $e_4$, which may be the same or different, each represents a hydrogen atom, a halogen atom (preferably, fluorine, chlorine, or bromine) or a hydrocarbon group having from 1 to 7 carbon atoms (preferably methyl, ethyl, propyl, butyl, 2-chloroethyl, 2-methoxyethyl, 2-methoxycarbonylethyl, benzyl, methoxybenzyl, phenyl, methoxyphenyl, or methoxycarbonylphenyl); and $e_5$, $e_6$, and $e_7$ each has the same meaning as $P_1$.

$W_1$ and $W_2$, which may be the same or different, each represents a divalent organic residue, including a divalent aliphatic or aromatic group which may have therein a linking group selected from —O—, —S—, $$-\underset{\overset{|}{P_2}}{N}-,$$

—SO—, —SO$_2$—, —COO—, —OCO—, —CONHCO—, —NHCONH—,

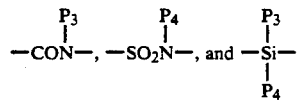

(wherein $P_2$, $P_3$, and $P_4$ each has the same meaning as $P_1$), and a combination of these divalent groups.

The divalent aliphatic group represented by $W_1$ or $W_2$ includes

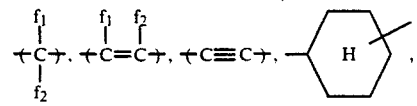

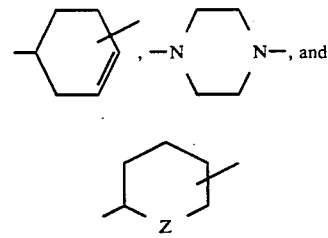

wherein $f_1$ and $f_2$, which may be the same or different, each represents a hydrogen atom, a halogen atom (e.g., fluorine, chlorine, and bromine) or an alkyl group having from 1 to 12 carbon atoms (e.g., methyl, ethyl, propyl, chloromethyl, bromomethyl, butyl, hexyl, octyl, nonyl, and decyl); Z represents —O—, —S— or —NR$_1$—, wherein R$_1$ represents an alkyl group having from 1 to 4 carbon atoms, —CH$_2$Cl or —CH$_2$Br.

Examples of the divalent aromatic group represented by $W_1$ or $W_2$ include a residue of a benzene ring, a naphthalene ring, or a 5- or 6-membered heterocyclic ring containing at least one hetero atom selected from oxygen, sulfur and nitrogen atoms. These aromatic groups may have a substituent, such as a halogen atom (e.g., fluorine, chlorine, and bromine), an alkyl group having from 1 to 8 carbon atoms (e.g., methyl, ethyl, propyl, butyl, hexyl, and octyl), and an alkoxyl group having from 1 to 6 carbon atoms (e.g., methoxy, ethoxy, propoxy, an butoxy).

Examples of the heterocyclic ring are furan, thiophene, pyridine, pyrazine, piperazine, tetrahydrofuran, pyrrole, tetrahydropyran, and 1,3-oxazoline rings.

In preferred macromonomers represented by formulae (II) and (IV), $b_1$, $b_2$, $X_2$, and $Y_2$ have the same meaning as $a_1$, $a_2$, $X_1$, and $Y_1$, respectively, as described above with respect to the preferred macromonomer of formulae (I) and (III).

$W_3$ represents a divalent aliphatic residue, and specifically

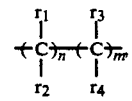

wherein $r_1$ and $r_2$, which may be the same or different, each represents a hydrogen atom or an alkyl group having from 1 to 8 carbon atoms; $r_3$ and $r_4$, which may be the same or different, each represents a hydrogen atom or an alkyl group having from 1 to 8 carbon atoms; n represents 0 or 1; and m represents an integer of from 3 to 18.

Specific examples of $W_3$ include

wherein n represents an integer of 2 to 18),

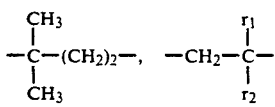

(wherein $r_1$ and $r_2$, which may be the same or different, each represents a hydrogen atom or an alkyl group having 1 to 12 carbon atoms such as a methyl group, an ethyl group, a propyl group, a butyl group, a hexyl group, an octyl group, a dodecyl group, etc., provided that $r_1$ and $r_2$ cannot be hydrogen atoms at the same time), or

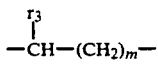

(wherein $r_3$ represents an alkyl group having 1 to 12 carbon atoms, for example, those described for $r_1$ and $r_2$ above, and m represents an integer of 2 to 18).

In the macromonomers represented by formulae (I) and (II), specific examples of the moieties shown by

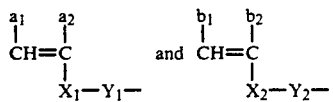

are shown below for illustrative purposes only but not for limitation. In the following formulae, a represents —H, —CH$_3$, —CH$_2$COOCH$_3$, —Cl, —Br, or —CN; b represents —H or —CH$_3$; h represents an integer of from 2 to 12; and i represents an integer of from 1 to 12.

 (A-1)

 (A-2)

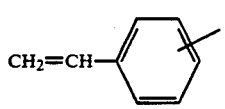 (A-3)

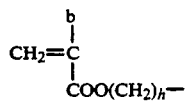 (A-4)

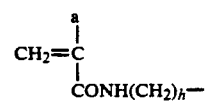 (A-5)

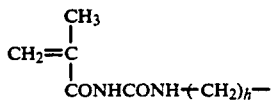 (A-6)

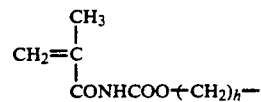 (A-7)

-continued

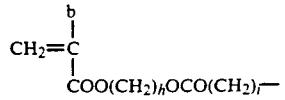 (A-8)

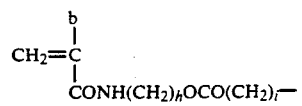 (A-9)

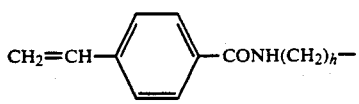 (A-10)

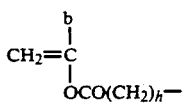 (A-11)

 (A-12)

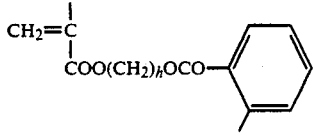 (A-13)

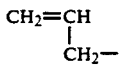 (A-14)

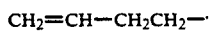 (A-15)

 (A-16)

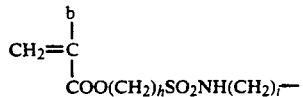 (A-17)

 (A-18)

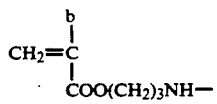 (A-19)

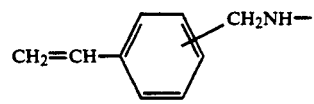 (A-20)

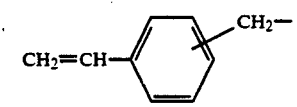 (A-21)

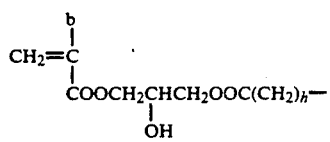 (A-22)

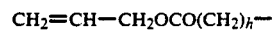 (A-23)

-continued

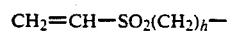 (A-24)

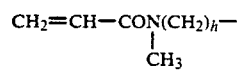 (A-25)

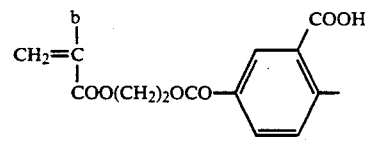 (A-26)

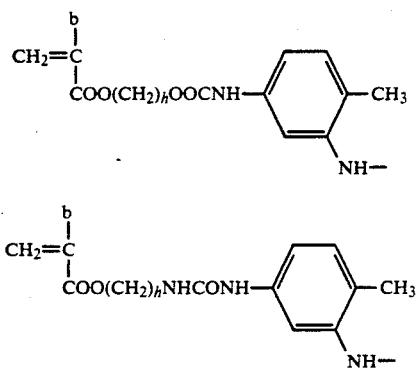 (A-27)

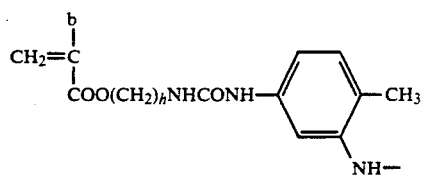 (A-28)

In the macromonomers represented by formulae (III) and (IV), specific examples of the moieties shown by

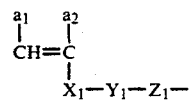

and

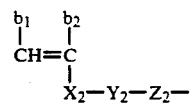

are shown below for illustrative purposes only but not for limitation. In the following formulae, a represents —H, —CH$_3$, —CH$_2$COOCH$_3$, —Cl, —Br, or —CN; b represents —H or —CH$_3$; X represents —Cl or —Br; h represents an integer of from 2 to 12; and i represents an integer of from 1 to 4.

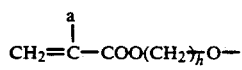 (A-29)

 (A-30)

 (A-31)

 (A-32)

(A-33)

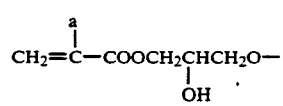 (A-34)

-continued

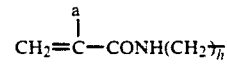 (A-35)

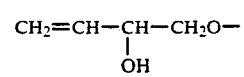 (A-36)

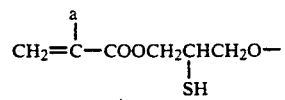 (A-37)

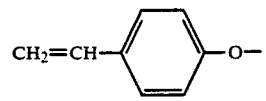 (A-38)

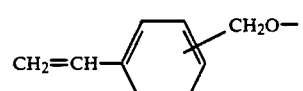 (A-39)

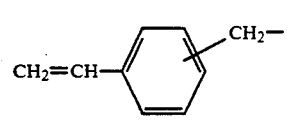 (A-40)

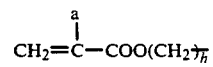 (A-41)

 (A-42)

 (A-43)

 (A-44)

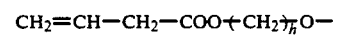 (A-45)

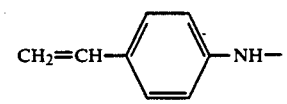 (A-46)

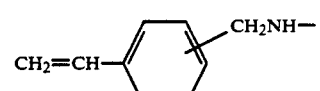 (A-47)

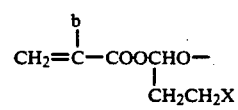 (A-48)

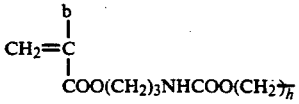 (A-49)

 (A-50)

Specific examples of W$_1$ and W$_2$ in formulae (I) and (III) are shown below for illustrative purposes only but not for limitation. In the following formulae, R$_1$ represents an alkyl group having from 1 to 4 carbon atoms, —CH₂Cl, or —CH₂Br; R₂ represents an alkyl group having from 1 to 8 carbon atoms, $$-(CH_2)_l-OR_1$$

(wherein R₁ is as defined above; and l represents an integer of from 2 to 8), —CH₂Cl, or —CH₂Br; R₃ represents —H or —CH₃; R₄ represents an alkyl group having from 1 to 4 carbon atoms; Z represents —O—, —S—, or —NR₁— (wherein R₁ is as defined above); p represents an integer of from 1 to 26; g represents 0 or an integer of from 1 to 4; r represents an integer of from 1 to 10; j represents 0 or an integer of from 1 to 4; and k represents an integer of from 2 to 6.

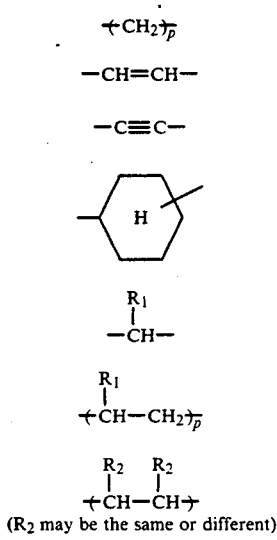

(B-1)
(B-2)
(B-3)
(B-4)
(B-5)
(B-6)
(B-7) (R₂ may be the same or different)
(B-8) (R₁ may be the same or different)
(B-9)
(B-10)
(B-11)
(B-12)
(B-13)

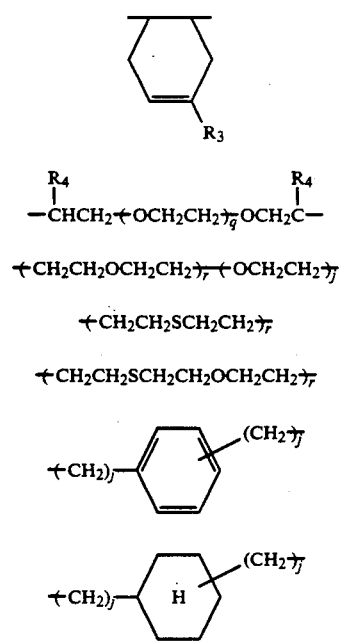

(B-14)
(B-15)

-continued

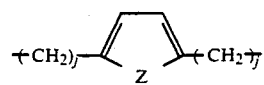 (B-16)

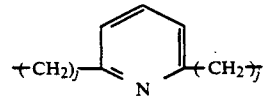 (B-17)

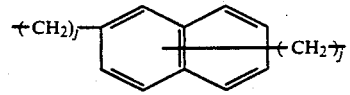 (B-18)

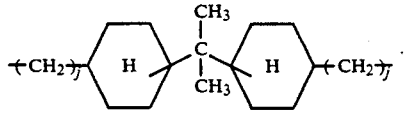 (B-19)

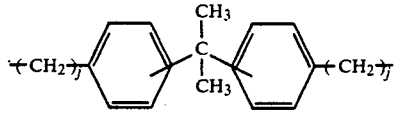 (B-20)

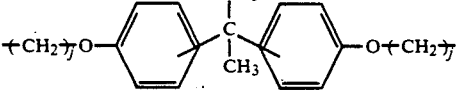 (B-21)

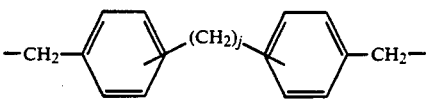 (B-22)

—CH₂—C≡C—CH₂— (B-23)

—CH₂—CH=CH—CH₂— (B-24)

—CH₂OCH₂CH₂— (B-25)

—CH₂CH₂CH₂OCH₂CH₂CH₂— (B-26)

$-(CH_2)_k-SO_2-(CH_2)_k-$ (B-27)

$-(CH_2)_k-S-S-(CH_2)_k-$ (B-28)

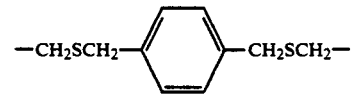 (B-29)

 (B-30)

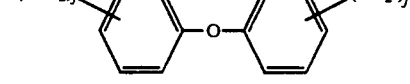 (B-31)

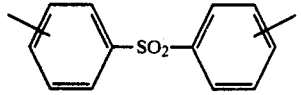 (B-32)

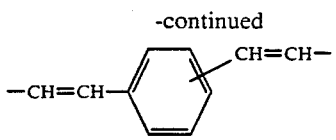 (B-33)

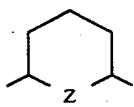 (B-34)

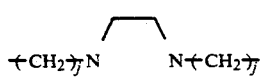 (B-35)

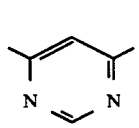 (B-36)

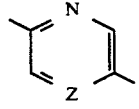 (B-37)

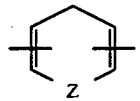 (B-38)

The macromonomer shown by formula (I) or (III) can be easily produced by a method comprising introducing a polymerizable double-bond group by a high polymer reaction into only one hydroxyl group- or carboxyl group-terminated end of a polyester oligomer having a weight average molecular weight of from $1 \times 10^3$ to $1.5 \times 10^4$ which is synthesized by polycondensation between a diol and a dicarboxylic acid or an anhydride or ester thereof as illustrated in Kobunshi Gakkai (ed.), *Kobunshi Data Handbook (Kisohen)*, Baifukan (1986).

The polyester oligomer can be synthesized by a conventional polycondensation reaction. More specifically, reference can be made to Eiichiro Takiyama, *Polyester Jushi Handbook*, Nikkan Kogyo Shinbunsha (1986), Kobunshi Gakkai (ed.), *Jushukugo to Jufuka*, Kyoritsu Shuppan (1980), and I. Goodman, *Encyclopedia of Polymer Science and Engineering*, Vol. 12, p. 1, John Wily & Sons (1985).

Introduction of a polymerizable double bond group into a hydroxyl group at one terminal of the polyester oligomer can be carried out by utilizing a reaction for forming an ester from an alcohol or a reaction for forming a urethane from an alcohol which are conventional in the field of low-molecular weight compounds.

In more detail, the introduction can be effected by a method of synthesizing the macromonomer through formation of an ester by the reaction between an alcohol and a carboxylic acid or an ester, halide or anhydride thereof containing a polymerizable double bond group in the molecule thereof or a method of synthesizing the macromonomer through formation of a urethane by the reaction between an alcohol and a monoisocyanate containing a polymerizable double bond group in the molecule thereof. For details, reference can be made to Chemical Society of Japan (ed.), *Shin Jikken Kagaku Koza*, No. 14, "Yuki Kagobutsu no Gosei to Han-no (II)", Ch. 5, Maruzen K.K. (1977), and ibid, "Yuki Kagobutsu no Gosei to Han-no (III)", p. 1652, Maruzen K.K. (1978).

Introduction of a polymerizable double bond group into a carboxyl group at one terminal of the polyester oligomer can be carried out by utilizing a reaction for forming an ester from a carboxylic acid or a reaction for forming an acid amide from a carboxylic acid which are conventional in the field of low-molecular weight compounds.

In more detail, the macromonomer can be synthesized by reacting a compound containing a polymerizable double bond group and a functional group capable of chemically reacting with a carboxyl group (e.g., —OH,

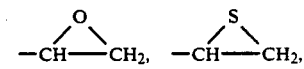

halide (e.g., chloride, bromide, and iodide), —NH₂, —COOT₂ (wherein T₂ is methyl, trifluoromethyl, 2,2,2-trifluoroethyl, etc.), etc.) in the molecule thereof with a polyester oligomer by a high polymer reaction. For details, reference can be made to The Chemical Society of Japan (ed.), *Shin Jikken Kagaku Koza*, No. 14, "Yuki Kagobutsu no Gosei to Han-no (II)", Ch. 5, Maruzen K.K. (1977), and Yoshio Iwakura and Keisuke Kurita, *Han-nosei Kobunshi*, Kodansha (1977).

The macromonomer shown by formula (II) or (IV) can be prepared by a method of synthesizing a polyester oligomer by self-polycondensation of a carboxylic acid containing a hydroxyl group in the molecule thereof and then forming a macromonomer from the oligomer by the high polymer reaction as is used for synthesizing the macromonomer of formula (I), or a method of synthesizing the macromonomer by a living polymerization reaction between a carboxylic acid containing a polymerizable double bond group and a lactone. For details, reference can be made to T. Yasuda, To. Aida and S. Inoue, *J. Macromol. Sci. Chem.*, A, Vol. 21, p. 1035 (1984), T. Yasuda, T. Aida and S. Inoue, *Macromolecules*, Vol. 17, p. 2217 (1984), S. Sosnowski, S. Stomkowski and S. Penczek, *Makromol. Chem.*, Vol. 188, p. 1347 (1987), Y. Gnanou and P. Rempp., *Makromol. Chem.*, Vol. 188, p. 2267 (1987), and S. Shiota and Y. Goto, *J. Appl. Polym. Sci.*, Vol. 11, p. 753 (1967).

Specific examples of the macromonomer represented by formula (I) or (II) are shown below. In the following formulae, brackets indicate a recurring unit sufficient for making the weight average molecular weight of the macromonomer fall in the range of from $1 \times 10^3$ to $1.5 \times 10^4$; d represents —H or —CH₃; R₅ and R₆, which may be the same or different, each represents —CH₃ or —C₂H₅; R₇ and R₈, which may be the same or different, each represents —Cl, —Br, —CH₂Cl or —CH₂Br; s represents an integer of from 1 to 25; t represents an integer of from 2 to 12; u represents an integer of from 2 to 12; x represents an integer of from 2 to 4; y represents an integer of from 2 to 6; and z represents an integer of from 1 to 4.

(M-1)
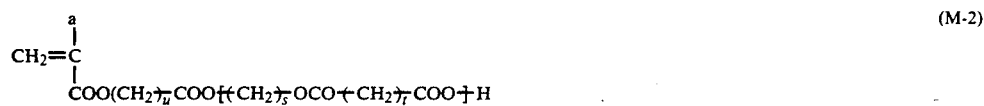
(M-2)
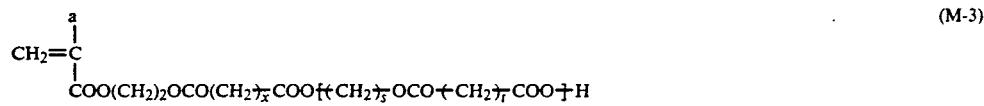
(M-3)
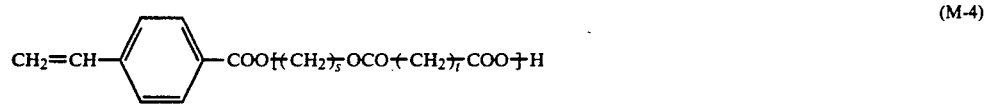
(M-4)
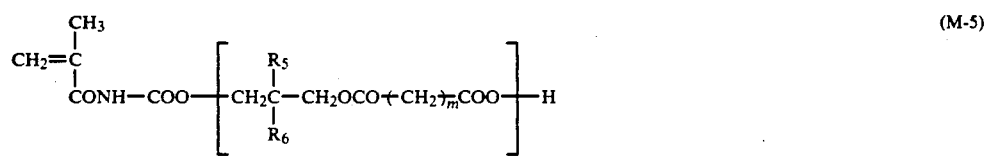
(M-5)
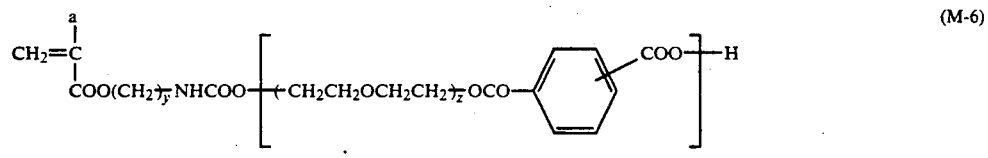
(M-6)
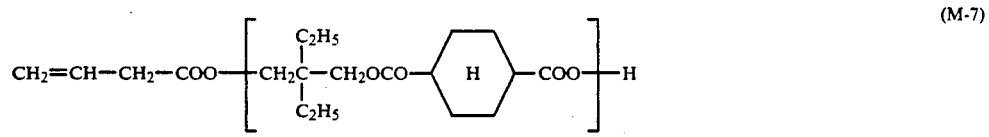
(M-7)
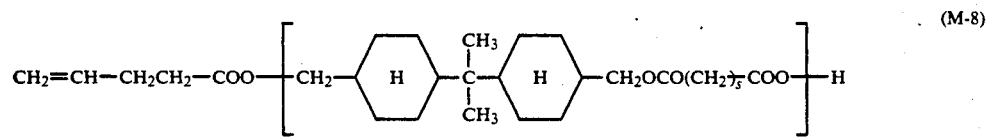
(M-8)
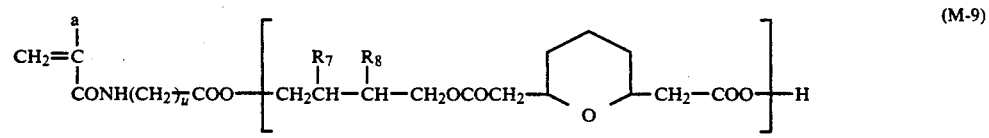
(M-9)
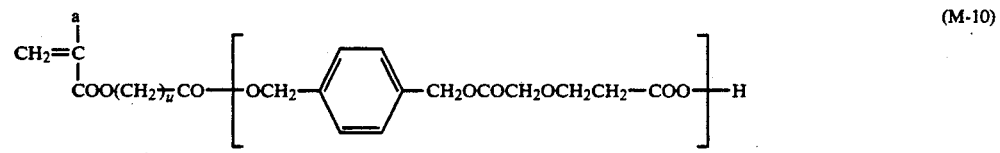
(M-10)
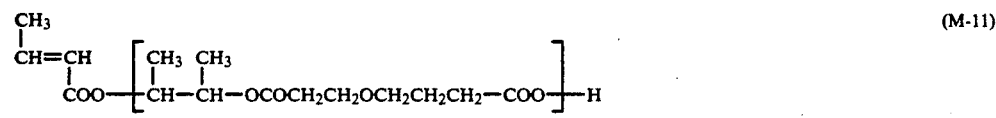
(M-11)
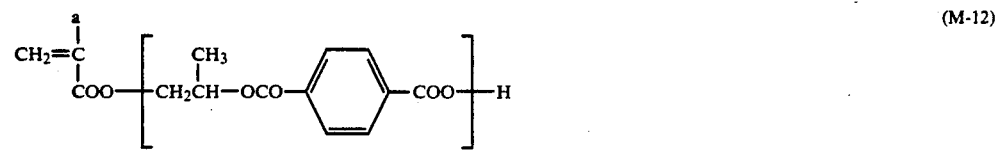
(M-12)

-continued
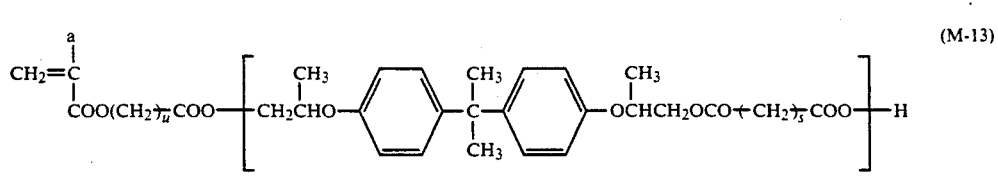
(M-13)
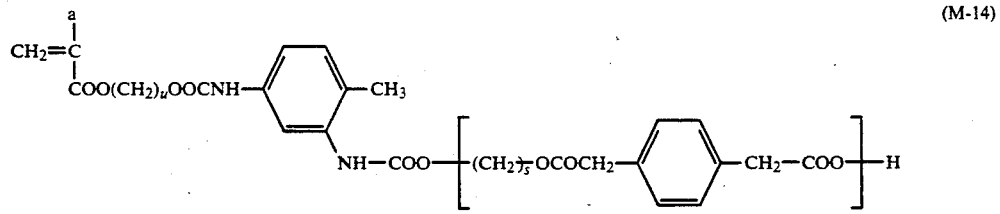
(M-14)
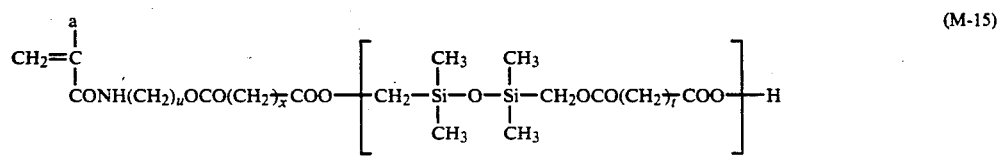
(M-15)
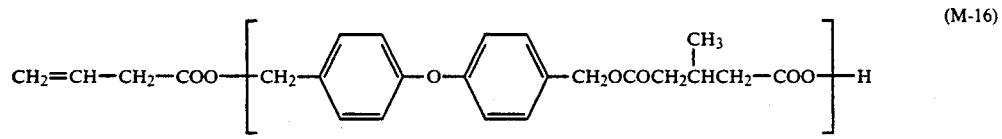
(M-16)
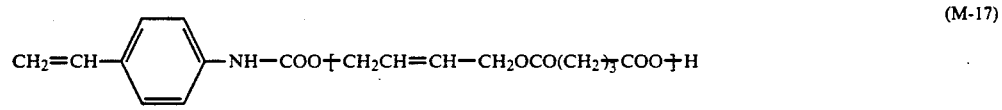
(M-17)
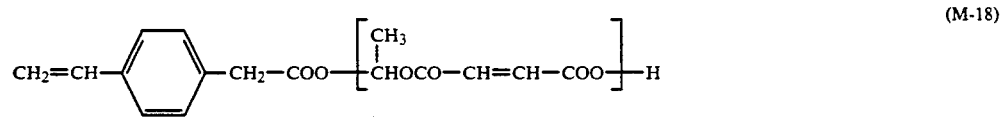
(M-18)
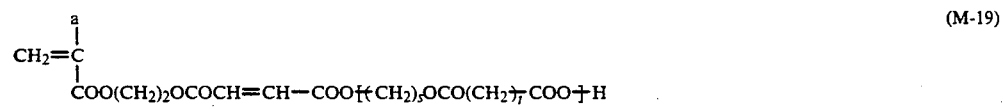
(M-19)
(M-20)
(M-21)
(M-22)
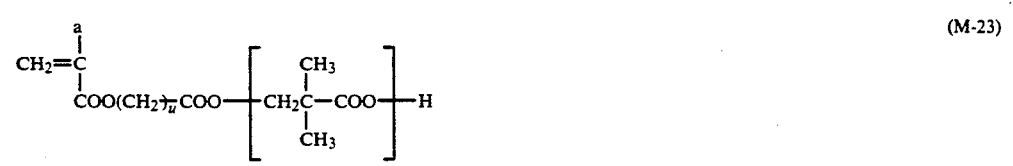
(M-23)

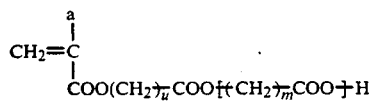
(M-24)

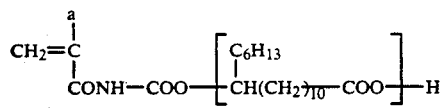
(M-25)

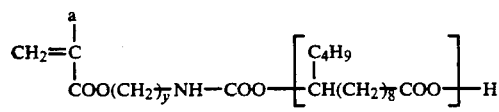
(M-26)

Specific examples of the macromonomer represented by formula (III) or (IV) are shown below. In the following formulae, brackets indicate a recurring unit sufficient for making the weight average molecular weight of the macromonomer fall in the range of from $1 \times 10^3$ to $1.5 \times 10^4$; d represents —H or —CH$_3$; R$_5$ and R$_6$, which may be the same or different, each represents —CH$_3$ or —C$_2$H$_5$; R$_7$ represents —CH$_3$, —C$_2$H$_5$, —C$_3$H$_7$ or —C$_4$H$_9$, Y represents —Cl or —Br, W represents —O— or —S—, s represents an integer of from 2 to 12; t represents an integer of from 1 to 25; u represents an integer of from 2 to 12; x represents an integer of from 2 to 16; y represents an integer of from 1 to 4; and z represents an integer of 0, 1 or 2.

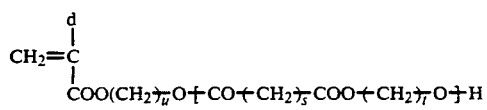
(M-27)

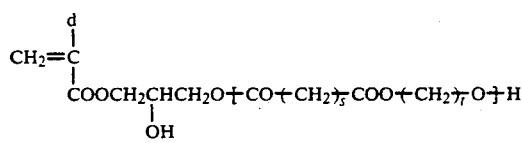
(M-28)

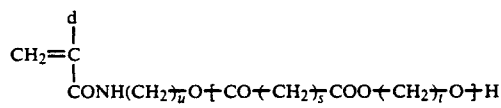
(M-29)

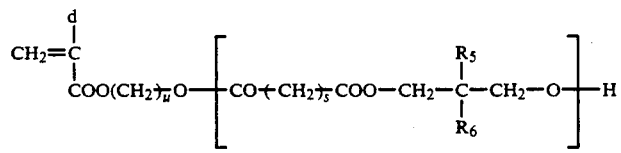
(M-30)

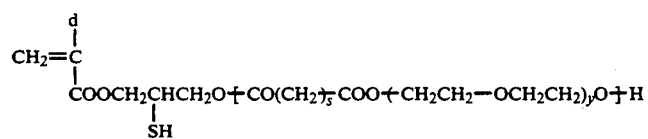
(M-31)

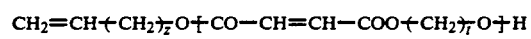
(M-32)

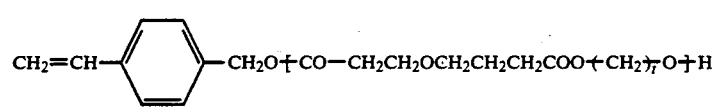
(M-33)

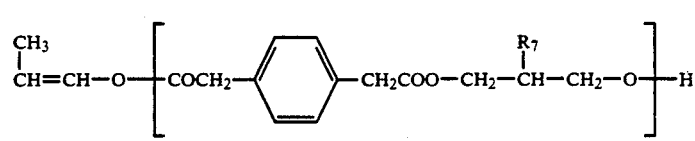
(M-34)

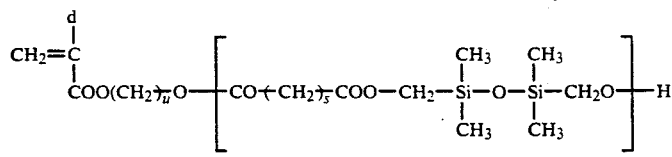 (M-35)
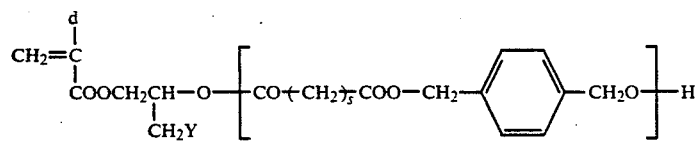 (M-36)
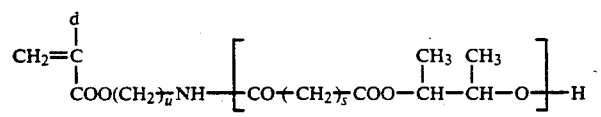 (M-37)
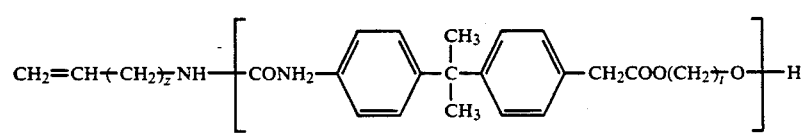 (M-38)
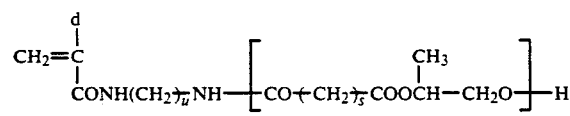 (M-39)
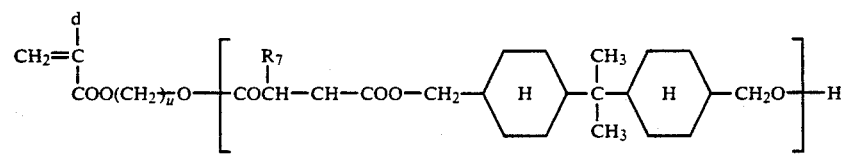 (M-40)
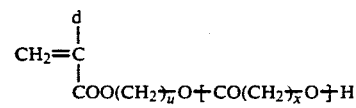 (M-41)
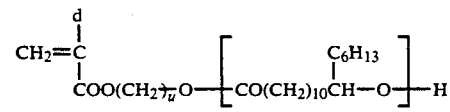 (M-42)
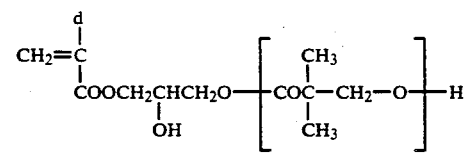 (M-43)
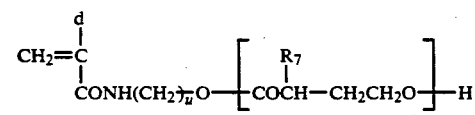 (M-44)
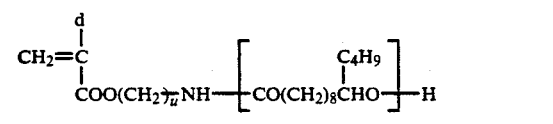 (M-45)
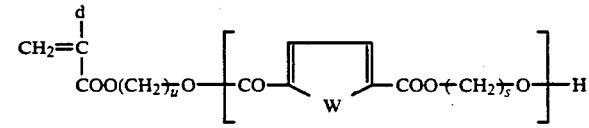 (M-46)

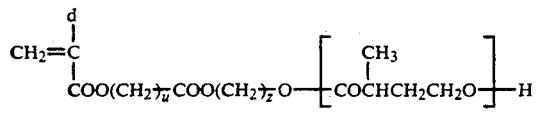

(M-47)

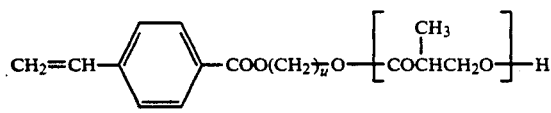

(M-48)

Resin (A) which can be used in the binder of the present invention is a graft copolymer comprising at least one of macromonomers selected from formulae (I), (II), (III), and (IV) as a copolymer component. Other copolymer components may be any of monomers which are radical copolymerizable with the macromonomer and capable of providing copolymers meeting the above-described physical properties required for the binder resin.

For example, resin (A) preferably contains, as a copolymer component in addition to the macromonomer, from 30 to 96.5% by weight, and more preferably from 40 to 90% by weight, of a monomer represented by the following formula (V) so as to provide a polyester content of the resulting mixture of from 60 to 3%:

(V)

wherein $c_1$ and $c_2$ have the same meaning as $a_1$ and $a_2$ in formulae (I) and (III), and preferably each represents a hydrogen atom or a methyl group; $X_3$ represents —COO—, —OCO— or —O—, and preferably —COO—; and $Z_3$ represents a hydrocarbon group having from 1 to 18 carbon atoms, and preferably a substituted or unsubstituted alkyl group having from 1 to 18 carbon atoms (e.g., methyl, ethyl, propyl, butyl, pentyl, hexyl, octyl, decyl, dodecyl, tridecyl, tetradecyl, 2-methoxyethyl, 2-ethoxyethyl, 2-hydroxyethyl, 3-hydroxypropyl, 2-hydroxypropyl, 2-chloroethyl, 2-cyanoethyl, 2-(N,N-dimethylamino)ethyl, 2,3-dihydroxypropyl, and 3-carbamoylpropyl), a substituted or unsubstituted aralkyl group having from 7 to 12 carbon atoms (e.g., benzyl, phenethyl, methoxybenzyl, ethoxybenzyl, methylbenzyl, dimethylbenzyl, chlorobenzyl, dichlorobenzyl, dibromobenzyl, acetoxybenzyl, cyanobenzyl, naphthylmethyl, and 2-naphthylethyl), a substituted or unsubstituted cycloalkyl group having from 5 to 8 carbon atoms (e.g., cyclopentyl, cyclohexyl, and cyclobutyl), an aryl group (e.g., phenyl, tolyl, xylyl, mesityl, naphthyl, methoxyphenyl, ethoxyphenyl, chlorophenyl, dichlorophenyl, bromophenyl, dibromophenyl, chlorobromophenyl, acetoxyphenyl, acetylphenyl, chloromethylphenyl, bromomethylphenyl, cyanophenyl, and methoxycarbonylphenyl), etc.

Resin (A) may further contain monomers other than the macromonomer (I), (II), (III), and/or (IV) and the monomer of formula (V), such as α-olefins, vinyl or allyl alkanoates, acrylonitrile, methacrylonitrile, vinyl ethers, acrylamides, methacrylamides, styrenes, and heterocyclic vinyl compounds (e.g., vinylpyrrolidone, vinylpyridine, vinylimidazole, vinylthiophene, vinylimidazoline, vinylpyrazole, vinyldioxane, vinylquinoline, vinylthiazole, and vinyloxazine).

The proportion of these monomers other than the macromonomer(s) and the monomer of formula (V) in the copolymer should not exceed 20% by weight.

In the graft copolymer of resin (A), if the proportion of the copolymer component corresponding to the macromonomer of formula (I), (II), (III) and/or (IV) is less than 3% by weight, dispersion of the coating composition for the photoconductive layer is insufficient. If it exceeds 60% by weight, copolymerization with the monomer of formula (V) does not proceed sufficiently, resulting in the formation of a homopolymer of the monomer of formula (V) or other monomer in addition to the desired graft copolymer. Besides, a dispersion of photoconductive particles in such a binder resin forms agglomerates of the photoconductive particles.

Resin (A) may contain, in addition to a carboxyl group or a hydroxyl group bonded at the terminal of the grafted portion thereof, a polar group selected from —PO$_3$H$_2$, —SO$_3$H, —COOH, —OH,

(wherein R represents a hydrogen atom or OR$_0$, wherein R$_0$ represents a hydrocarbon group), and a cyclic acid anhydride-containing group at the terminal of the main chain thereof (i.e., resin (A')). Further, resin (A) having no such polar group and resin (A') having the polar group may be used in combination.

In the polar group

the hydrocarbon group as represented by R or R$_0$ includes an aliphatic group having from 1 to 18 carbon atoms and an aromatic group having from 6 to 12 carbon atoms. Examples of the aliphatic group include an alkyl group having from 1 to 18 carbon atoms (e.g., methyl, ethyl, propyl, butyl, heptyl, hexyl, octyl, decyl, dodecyl, tridecyl, hexadecyl, octadecyl, 2-chloroethyl, 2-bromoethyl, 2-hydroxyethyl, 2-methoxyethyl, 2-ethoxyethyl, 2-cyanoethyl, 3-chloropropyl, 2-(trimethoxysilyl)ethyl, 2-tetrahydrofuryl, 2-thienylethyl, 2-N,N-dimethylaminoethyl, and 2-N,N-diethylaminoethyl), a cyanoalkyl group having from 5 to 8 carbon atoms (e.g., cycloheptyl, cyclohexyl, and cyclooctyl), and a substituted or unsubstituted aralkyl group having from 7 to 12 carbon atoms (e.g., benzyl, phenethyl, 3-phenylpropyl, naphthylmethyl, 2-naphthylethyl, chlorobenzyl, bromobenzyl, dichlorobenzyl, methylbenzyl, chloromethylbenzyl, dimethylbenzyl, trimethylbenzyl, and methoxybenzyl). Examples of the aromatic group include a substituted or unsubstituted aryl group (e.g., phenyl, tolyl, xylyl, chlorophenyl, bromophenyl, dichlorophenyl, chloromethylphenyl, methoxyphenyl, methoxycarbonylphenyl, naphthyl, and chloronaphthyl).

The polar group —OH includes alcohols containing a vinyl group or an allyl group (e.g., compounds containing —OH in the ester substituent or N-substituent thereof, e.g., allyl alcohol, methacrylic esters, and acrylamide), hydroxyphenol, and methacrylic acid esters or amides containing a hydroxyphenyl group as a substituent.

The cyclic acid anhydride-containing group is a group containing at least one cyclic acid anhydride moiety. The cyclic acid anhydride which is present includes aliphatic dicarboxylic acid anhydrides and aromatic dicarboxylic acid anhydrides.

Specific examples of aliphatic dicarboxylic acid anhydride rings include a succinic anhydride ring, a glutaconic anhydride ring, a maleic anhydride ring, a cyclopentane-1,2-dicarboxylic acid anhydride ring, a cyclohexane-1,2-dicarboxylic acid anhydride ring, a cyclohexene-1,2-dicarboxylic acid anhydride ring, and a 2,3-bicyclo[2,2,2]octanedicarboxylic acid anhydride ring. These rings may have a substituent, such as a halogen atom (e.g., chlorine and bromine) and an alkyl group (e.g., methyl, ethyl, butyl, and hexyl).

Specific examples of aromatic dicarboxylic acid rings include a phthalic anhydride ring, a naphthalene-dicarboxylic acid anhydride ring, a pyridine-dicarboxylic acid anhydride ring, and a thiophene-dicarboxylic acid anhydride ring. These rings may have a substituent, such as a halogen atom (e.g., chlorine and bromine), an alkyl group (e.g., methyl, ethyl, propyl, and butyl), a hydroxyl group, a cyano group, a nitro group, and an alkoxycarbonyl group (e.g., methoxycarbonyl and ethoxycarbonyl).

Resin (A') can be synthesized by a method using a polymerization initiator containing the specific polar group or a functional group capable of being converted to the polar group, a method using a chain transfer agent containing the specific polar group or a functional group capable of being converted to the polar group, a method using both of the polymerization initiator and chain transfer agent, and a method using the aforesaid functional group by taking advantage of reaction cease in anion polymerization. Reference can be made to, e.g., P. Dreyfuss, R. P. Quirk, *Encycl. Polym. Sci. Enc.*, Vol. 7, p. 551 (1987), V. Percec, *Appl. Polym. Sci.*, Vol. 285, p. 95 (1985), P. F. Rempp, E. Franta, *Adv. Polym. Sci.*, Vol. 58, p. 1 (1984), Y. Yamashita, *J. Appl. Polym. Sci. Appl. Polym. Symp.*, Vol. 36, p. 193 (1981), and R. Asami and M. Takaki, *Makromol. Chem. Suppl.*, Vol. 12, p. 163 (1985).

The binder resin according to the present invention may contain two or more kinds of resin (A), inclusive of resin (A').

Resin (B) is a resin containing at least one recurring unit represented by formula (VI), having a partially crosslinked structure, and having a weight average molecular weight of $5 \times 10^4$ or more, and preferably from $8 \times 10^4$ to $6 \times 10^5$.

Resin (B) preferably has a glass transition point ranging from 0° C. to 120° C., and more preferably from 10° C. to 95° C.

If the weight average molecular weight of resin (B) is less than $5 \times 10^4$, the effect of improving film strength is insufficient. If it exceeds the above-recited preferred upper limit, on the other hand, resin (B) has no substantial solubility in organic solvents and thus cannot be practically used.

Resin (B) is a polymer satisfying the above-mentioned physical properties with a part thereof being crosslinked, including a homopolymer comprising the recurring unit shown by formula (VI) or a copolymer comprising the recurring unit of formula (VI) and other monomer copolymerizable with the monomer corresponding to the recurring unit of formula (VI).

In formula (VI), hydrocarbon groups may have a substituent.

$X_4$ preferably represents —COO—, —OCO—, —CH$_2$OCO—, —CH$_2$COO—, or —O—, and more preferably —COO—, —CH$_2$COO—, or —O—.

$Z_4$ preferably represents a substituted or unsubstituted hydrocarbon group having from 1 to 18 carbon atoms. The substituent may be any of substituents other than the aforesaid polar groups which may be bonded to the one terminal of the polymer main chain. Examples of such substituents include a halogen atom (e.g., fluorine, chlorine, and bromine), —O—V$_1$, —COO—V$_2$, and —OCO—V$_3$, wherein V$_1$, V$_2$, and V$_3$ each represents an alkyl group having from 6 to 22 carbon atoms (e.g., hexyl, octyl, decyl, dodecyl, hexadecyl, and octadecyl). Specific examples of preferred hydrocarbon groups are a substituted or unsubstituted alkyl group having from 1 to 18 carbon atoms (e.g., methyl, ethyl, propyl, butyl, heptyl, hexyl, octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), a substituted or unsubstituted alkenyl group having from 4 to 18 carbon atoms (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), a substituted or unsubstituted aralkyl group having from 7 to 12 carbon atoms (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), a substituted or unsubstituted alicyclic group having from 5 to 8 carbon atoms (e.g., cyclohexyl, 2-cyclohexylethyl, and 2-cyclopentylethyl), and a substituted or unsubstituted aromatic group having from 6 to 12 carbon atoms (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, and dodecyloylamidophenyl).

$d_1$ and $d_2$, which may be the same or different, each preferably represents a hydrogen atom, a halogen atom (e.g., fluorine, chlorine, and bromine), a cyano group, an alkyl group having from 1 to 3 carbon atoms, —COO—Z', or —CH$_2$COO—Z', wherein Z' preferably represents an aliphatic group having from 1 to 22 carbon atoms. More preferably, $d_1$ and $d_2$, which may be the same or different, each represents a hydrogen atom, an alkyl group having from 1 to 3 carbon atoms (e.g., methyl, ethyl, and propyl), —COO—Z', or —CH$_2$COO—Z', wherein Z' more preferably represents an alkyl group having from 1 to 18 carbon atoms or an alkenyl group (e.g., methyl, ethyl, propyl, butyl, hexyl, octyl, decyl, dodecyl, tridecyl, tetradecyl, hexadecyl, octadecyl, pentenyl, hexenyl, octenyl, and decenyl).

These alkyl or alkenyl groups may be substituted with the same substituent(s) as enumerated with respect to $Z_4$.

In the production of resin (B), introduction of a crosslinked structure in the polymer can be achieved by known techniques, for example, a method of conducting polymerization of the monomer of formula (VI) in the presence of a polyfunctional monomer and a method of preparing a polymer containing a crosslinking functional group and conducting a crosslinking reaction through a high polymer reaction.

From the standpoint of ease and convenience of procedure, that is, considered that there are involved no unfavorable problems such that a long time is required for the reaction, the reaction is not quantitative, or impurities arising from a reaction accelerator, etc. are incorporated into the product, it is preferable to synthesize resin (B) by using a self-crosslinkable functional group: —CONHCH$_2$OR$_{10}$ (wherein R$_{10}$ represents a hydrogen atom or an alkyl group) or by utilizing crosslinking through polymerization.

Where a polymerizable reactive group is used, it is preferable to copolymerize a monomer containing two or more polymerizable functional groups and the monomer of formula (VI) to thereby form a crosslinked structure over polymer chains.

Specific examples of suitable polymerizable functional groups are CH$_2$=CH—, CH$_2$=CH—CH$_2$—,

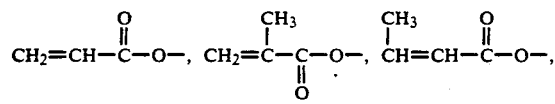

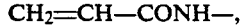

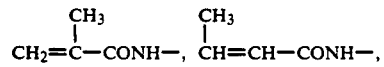

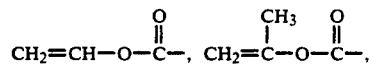

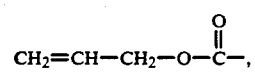

CH$_2$=CH—NHCO—, CH$_2$=CH—CH$_2$—NHCO—, CH$_2$=CH—SO$_2$—, CH$_2$=CH—CO—, CH$_2$=CH—O—, and CH$_2$=CHS—. The two or more polymerizable functional groups in the monomer may be the same or different.

Specific examples of the monomer having two or more same polymerizable functional groups include styrene derivatives (e.g., divinylbenzene and trivinylbenzene); esters of a polyhydric alcohol (e.g., ethylene glycol, diethylene glycol, triethylene glycol, polyethylene glycol #200, #400 or #600, 1,3-butylene glycol, neopentyl glycol, dipropylene glycol, polypropylene glycol, trimethylolpropane, trimethylolethane, and pentaerythritol) or a polyhydroxyphenol (e.g., hydroquinone, resorcin, catechol, and derivatives thereof) and methacrylic acid, acrylic acid or crotonic acid; vinyl esters, allyl esters, vinylamides or allylamides of a dibasic acid (e.g., malonic acid, succinic acid, glutaric acid, adipic acid, pimelic acid, maleic acid, phthalic acid, and itaconic acid); and condensates of a polyamine (e.g., ethylenediamine, 1,3-propylenediamine, and 1,4-butylenediamine) and a carboxylic acid having a vinyl group (e.g., methacrylic acid, acrylic acid, crotonic acid, and allylacetic acid).

Specific examples of the monomer having two or more different polymerizable functional groups include vinyl-containing ester derivatives or amide derivatives of a vinyl-containing carboxylic acid (e.g., methacrylic acid, acrylic acid, methacryloylacetic acid, acyrloylacetic acid, methacryloylpropionic acid, acryloylpropionic acid, itaconyloylacetic acid, itaconyloylpropionic acid, and a reaction product of a carboxylic acid anhydride and an alcohol or an amine (e.g., allyloxycarbonylpropionic acid, allyloxycarbonylacetic acid, 2-allyloxycarbonylbenzoic acid, and allylaminocarbonylpropionic acid)) (e.g., vinyl methacrylate, vinyl acrylate, vinyl itaconate, allyl methacrylate, allyl acrylate, allyl itaconate, vinyl methacryloylacetate, vinyl methacryloylpropionate, allyl methacryloylpropionate, vinyloxycarbonylmethylmethacrylate, vinyloxycarbonylmethyloxycarbonylethylene acrylate, N-allylacrylamide, N-allylmethacrylamide, N-allylitaconic acid amide, and methacryloylpropionic acid allylamide) and condensates of an amino alcohol (e.g., aminoethanol, 1-aminopropanol, 1-aminobutanol, 1-aminohexanol, and 2-aminobutanol) and a vinyl-containing carboxylic acid.

Resin (B) having a partially crosslinked structure can be obtained by polymerization using the above-described monomer having two or more polymerizable functional groups in a proportion of not more than 20% by weight based on the total monomers. It is more preferable for the monomer having two or more polymerizable functional groups to be used in a proportion of not more than 15% by weight in cases where a polar group is introduced into the terminal by using a chain transfer agent hereinafter described, or in a proportion of not more than 5% by weight in other cases.

On the other hand, where resin (B) contains no polar group at the terminal thereof (i.e., resin (B) other than resin (B')), a crosslinked structure may be formed in resin (B) by using a resin containing a crosslinking functional group which undergoes curing on application of heat and/or light.

Such a crosslinking functional group may be any of those capable of undergoing a chemical reaction between molecules to form a chemical bond. That is, a mode of reaction inducing intermolecular bonding by condensation, addition reaction, etc. or crosslinking, etc. by polymerization upon application of heat and/or light can be made of use.

Examples of the above-described crosslinking functional group include (i) at least one combination of (i-1) a functional group having a dissociative hydrogen atom {e.g., —COOH, —PO$_3$H$_2$,

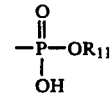

(wherein R$_{11}$ represents an alkyl group having from 1 to 18 carbon atoms (preferably an alkyl group having from 1 to 6 carbon atoms (e.g., methyl, ethyl, propyl, butyl, and hexyl)), an aralkyl group having from 7 to 11 carbon atoms (e.g., benzyl, phenethyl, methylbenzyl, chlorobenzyl, and methoxybenzyl), an aryl group having from 6 to 12 carbon atoms (e.g., phenyl, tolyl, xylyl, mesitylene, chlorophenyl, ethylphenyl, methoxyphenyl, and naphthyl), —OR$_{12}$ (wherein R$_{12}$ is the same as the above-mentioned hydrocarbon group), —OH, —SH, and —NH.R₁₃ (wherein R₁₃ represents a hydrogen atom or an alkyl group having from 1 to 4 carbon atoms, e.g., methyl, ethyl, propyl, and butyl)} and (i-2) a functional group selected from the group consisting of

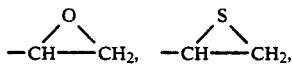

—NCO, and —NCS; and (ii) a group containing —CONHCH₂OR₁₄ (wherein R₁₄ represents a hydrogen atom or an alkyl group having from 1 to 6 carbon atoms, e.g., methyl, ethyl, propyl, butyl, and hexyl) or a polymerizable double bond group.

Specific examples of the polymerizable double bond group are the same as those enumerated above for the polymerizable functional groups.

More specific examples of the functional groups and compounds to be used are described, e.g., in Tsuyoshi Endo, *Netsukokasei Kobunshi no Seimitsuka*, C.M.C K.K. (1986), Yuji Harada, *Saishin Binder Gijutsu Binran*, Ch. II-1, Sogo Gijutsu Center (1985), Takayuki Ohtsu, *Acryl Jushi no Gosei Sekkei to Shin Yoto Kaihatsu*, Chubu Keisei Kaihatsu Center Shuppanbu (1985), Eizo Ohmori, *Kinosei Acryl Jushi*, Techno System (1985), Hideo Inui and Gentaro Nagamatsu, *Kankosei Kobunshi*, Kodansha (1977), Takahiro Kadota, *Shin Kankosei Jushi*, Insatsu Gakkai Shuppanbu (1981), G. E. Green and B. P. Star R. *J. Macro. Sci. Revs. Macro. Chem.*, C21(2), pp. 187–273 (1981-1982), and C. G. Roffey, *Photopolymerization of Surface Coatings*, A. Wiley Interscience Pub. (1982).

These crosslinking functional groups may be present in the same copolymer component or separately in different copolymer components.

The monomer corresponding to the copolymer component containing the crosslinking functional group includes vinyl compounds containing such a functional group and capable of copolymerizable with the monomer of formula (VI). Examples of such vinyl compounds are described, e.g., in Kobunshi Gakkai (ed.), *Kobunshi Data Handbook* (*Kiso-hen*), Baifukan (1986). Specific examples of these vinyl monomers are acrylic acid, α-and/or β-substituted acrylic acids (e.g., α-acetoxy, α-acetoxymethyl, α-(2-amino)methyl, α-chloro, α-bromo, α-fluoro, α-tributylsilyl, α-cyano, β-chloro, β-bromo, α-chloro-β-methoxy, and α,β-dichloro compounds)), methacrylic acid, itaconic acid, itaconic half esters, itaconic half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-methyl-2-octenoic acid), maleic acid, maleic half esters, maleic half amides, vinylbenzenecarboxylic acid, vinylbenzenesulfonic acid, vinylsulfonic acid, vinylphosphonic acid, vinyl or allyl half ester derivatives of dicarboxylic acids, and ester or amide derivatives of these carboxylic acids or sulfonic acids containing the crosslinking functional group in the substituents thereof.

The proportion of the above-described copolymer component containing the crosslinking functional group in resin (B) preferably ranges from 1 to 80 by weight, and more preferably from 5 to 50% by weight.

In the preparation of such a resin, a reaction accelerator may be used, if desired, to accelerate crosslinking. Examples of usable reaction accelerators include acids (e.g., acetic acid, propionic acid, butyric acid, benzenesulfonic acid, and p-toluenesulfonic acid), peroxides, azobis compounds, crosslinking agents, sensitizing agents, and photopolymerizable monomers. Specific examples of crosslinking agents are described in Shinzo Yamashita and Tosuke Kaneko (ed.), *Kakyozai Handbook*, Taiseisha (1981), including commonly employed crosslinking agents, such as organosilanes, polyurethanes, and polyisocyanates, and curing agents, such as epoxy resins and melamine resins.

Where the resin contains a light-crosslinking functional group, compounds described in the literature cited above with respect to photosensitive resins can be used.

Resin (B) may further contain, as copolymer component, other monomers (e.g., those enumerated above as optional monomers which may be present in resin (A)), in addition to the monomer corresponding to the recurring unit of formula (VI) and the above-described polyfunctional monomer.

While resin (B) is characterized by its partial crosslinked structure as stated above, it is also required to be soluble in an organic solvent used for the preparation of a dispersion for forming a photoconductive layer. More specifically, it is required that at least 5 parts by weight of resin (B) be dissolved in 100 parts by weight of toluene at 5° C. Solvents which can be used in the preparation of the dispersion include halogenated hydrocarbons, e.g., dichloromethane, dichloroethane, chloroform, methylchloroform, and triclene; alcohols, e.g., methanol, ethanol, propanol, and butanol; ketones, e.g., acetone, methyl ethyl ketone, and cyclohexanone; ethers, e.g., tetrahydrofuran and dioxane; esters, e.g., methyl acetate, ethyl acetate, propyl acetate, butyl acetate, and methyl propionate; glycol ethers, e.g., ethylene glycol monomethyl ether, 2-methoxyethylacetate; and aromatic hydrocarbons, e.g., benzene, toluene, xylene, and chlorobenzene. These solvents may be used either individually or as a mixture thereof.

According to a preferred embodiment of resin (B), resin (B') is a polymer having a weight average molecular weight of $5 \times 10^4$ or more, and preferably between $8 \times 10^4$ and $6 \times 10^5$, containing at least one recurring unit represented by formula (IV), having a partially crosslinked structure and, in addition, having at least one polar group selected from the group consisting of —PO₃H₂, —SO₃H, —COOH, —OH (specifically including those enumerated with respect to resin (A')), —SH,

(wherein R' represents a hydrocarbon group or —OR₀', wherein R₀' represents a hydrocarbon group (specifically those enumerated above with respect to R), a cyclic acid anhydride-containing group (specifically including those enumerated with respect to resin (A')), —CHO, —CONH₂, —SO₂NH₂, and

(wherein $g_1$ and $g_2$, which may be the same or different, each represents a hydrogen atom or a hydrocarbon group) bonded to one terminal of at least one main chain thereof.

Resin (B') preferably has a glass transition point of from 0° C. to 120° C., and more preferably from 10° C. to 95° C.

The cyclic acid anhydride-containing group which is present in resin (B') is the same as that described above with respect to resin (A').

In the polar group

specific examples of $g_1$ and $g_2$ are a hydrogen atom, a substituted or unsubstituted aliphatic group having from 1 to 10 carbon atoms (e.g., methyl, ethyl, propyl, butyl, hexyl, octyl, 2-cyanoethyl, 2-chloroethyl, 2-ethoxycarbonylethyl, benzyl, phenethyl, and chlorobenzyl), and a substituted or unsubstituted aryl group (e.g., phenyl, tolyl, xylyl, chlorophenyl, bromophenyl, methoxycarbonylphenyl, and cyanophenyl).

Of the terminal polar groups in resin (B'), preferred are $-PO_3H_2$, $-COOH$, $-SO_3H$, $-OH$, $-SH$,

$-CONH_2$, and $-SO_2NH_2$.

In resin (B') the specific polar group is bonded to one terminal of the polymer main chain either directly or via an arbitrary linking group. The linking group includes a carbon-carbon bond (single bond or double bond), a carbon-hetero atom bond (the hetero atom including an oxygen atom, a sulfur atom, a nitrogen atom, and a silicon atom), a hetero atom-hetero atom bond, or an arbitrary combination thereof. Specific examples of the linking group are

(wherein $R_{21}$ and $R_{22}$ each represents a hydrogen atom, a halogen atom (e.g., fluorine, chlorine, and bromine), a cyano group, a hydroxyl group, an alkyl group (e.g., methyl, ethyl, and propyl), etc.),

$-O-$, $-S-$,

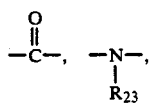

$-COO-$, $-SO_2-$,

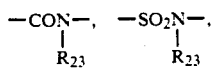

$-NHCOO-$, $-NHCONH-$, and

wherein $R_{23}$ and $R_{24}$ each represents a hydrogen atom, a hydrocarbon group having from 1 to 8 carbon atoms (e.g., methyl, ethyl, propyl, butyl, pentyl, hexyl, benzyl, phenethyl, phenyl, and tolyl) or $-OR_{25}$ (wherein $R_{25}$ has the same meaning as the hydrocarbon group of $R_{23}$).

Resin (B') having a specific polar group bonded to only one terminal of at least one polymer main chain thereof can be easily synthesized by a method comprising reacting various reagents on the terminal of a living polymer obtained by conventional anion polymerization or cation polymerization (ion polymerization method), a method comprising radical polymerization using a polymerization initiator and/or chain transfer agent containing a specific polar group in the molecule (radical polymerization method), or a method comprising once preparing a polymer terminated with a reactive group by the aforesaid ion polymerization method or radical polymerization method and converting the terminal reactive group into a specific polar group by a high molecular weight reaction. For details, reference can be made to P. Dreyfuss and R. P. Quirk *Encycl. Polym. Sci. Eng.*, Vol. 7, p. 551 (1987), Yoshiki Nakajo and Yuya Yamashita, *Senryo to Yakuhin*, Vol. 30, p. 232 (1985), and Akira Ueda and Susumu Nagai, *Kagaku to Kogyo*, Vol. 60, p. 57 (1986), and literatures cited therein.

In greater detail, resin (B') can be prepared by a method in which a mixture of the recurring unit shown by formula (IV), the above-described polyfunctional monomer for forming a crosslinked structure, and a chain transfer agent containing a specific polar group to be introduced to one terminal is polymerized in the presence of a polymerization initiator (e.g., azobis compounds and peroxides), a method using a polymerization initiator containing a specific polar group to be introduced without using the aforesaid chain transfer agent, or a method using a chain transfer agent and a polymerization initiator both of which contain a specific polar group to be introduced. Further, resin (B') may also be obtained by conducting polymerization using a compound having a polar group and a functional group, such as an amino group, a halogen atom, an epoxy resin, an acid halide group, etc., as the chain transfer agent or polymerization initiator according to any of the three methods set forth above, followed by reacting such a functional group with a monomer through a high polymer reaction to thereby introduce the polar group into the resulting polymer. Suitable chain transfer agents include mercapto compounds containing a polar group or a substituent capable of being converted to a polar group, e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[N-mercaptoethyl)-amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol,3-mercapto-1,2-propanediol, 1-mercapto-2-propanol, 3-mercapto-2-butanol, mercaptophenol, 2-mercaptoethylamine, 2-mercaptoimidazole, and 2-mercapto-3-pyridinol; and iodoalkyl compounds containing a polar group or a substituent capable of being converted to a polar group, e.g., iodoacetic acid, iodopropionic acid, 2-iodoethanol, 2-iodoethanesulfonic acid, and 3-iodopropanesulfonic acid. Preferred of them are mercapto compounds.

The chain transfer agent or polymerization initiator is used in an amount of from 0.1 to 15 parts by weight, and preferably from 0.5 to 10 parts by weight, per 100 parts by weight of the total monomers.

The binder resin of the present invention may further comprise, in addition to resins (A) (inclusive of resin (A')) and (B) (inclusive of resin (B')), other known resins, such as alkyd resins, polybutyral resins, polyolefins, ethylene-vinyl acetate copolymers, styrene resins, styrene-butadiene resins, acrylate-butadiene resins, and vinyl alkanoate resins, in a proportion up to 30% by weight based on the total binder resin. If the proportion of these other resins exceed 30% by weight, the effects of the present invention, particularly on improvement of electrostatic characteristics, are lost.

The ratio of resin (A) to resin (B) varies depending on the kind, particle size, and surface conditions of the inorganic photoconductive particles used. In general, the weight ratio of resin (A) to resin (B) is 5 to 80:95 to 20, and preferably 15 to 60:85 to 40.

The inorganic photoconductive material which can be used in the present invention includes zinc oxide, titanium oxide, zinc sulfide, cadmium sulfide, cadmium carbonate, zinc selenide, cadmium selenide, tellurium selenide, and lead sulfide, with zinc oxide and titanium oxide being preferred.

The binder resin is used in a total amount of from 10 to 100 parts by weight, and preferably from 15 to 50 parts by weight, per 100 parts by weight of the inorganic photoconductive material.

If desired, the photoconductive layer according to the present invention may contain various spectral sensitizers. Examples of suitable spectral sensitizers are carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, and styryl dyes), phthalocyanine dyes (inclusive of metallized dyes), and the like as described in Harumi Miyamoto and Hidehiko Takei, *Imaging*, Vol. 1973, No. 8, p. 12, C. J. Young, et al., *RCA Review*, Vol. 15, p. 469 (1954), Kohei Kiyota, et al., *Journal of Electric Communication Society of Japan*, J63-C, No. 2, p. 97 (1980), Yuji Harasaki, et al., *Kogyo Kagaku Zasshi*, Vol. 66, pp. 78 and 188 (1963), and Tadaaki Tani, *Journal of the Society of Photographic Science and Technology of Japan*, Vol. 35, p. 208 (1972).

Specific examples of suitable carbonium dyes, triphenylmethane dyes, xanthene dyes, and phthalein dyes are described in JP-B-51-452, JP-A-50-90334, JP-A-50-114227, JP-A-53-39130, JP-A-53-82353, U.S. Pat. Nos. 3,052,540 and 4,054,450, and JP-A-57-16456.

Suitable polymethine dyes, such as oxonol dyes, merocyanine dyes, cyanine dyes, and rhodacyanine dyes, include those described in F. M. Harmer, *The Cyanine Dyes and Related Compounds*. Specific examples are described in U.S. Pat. Nos. 3,047,384, 3,110,591, 3,121,008, 3,125,447, 3,128,179, 3,132,942, and 3,622,317, British Patents 1,226,892, 1,309,274, and 1,405,898, JP-B-48-7814, and JP-B-55-18892.

In addition, polymethine dyes for spectral sensitization in the longer wavelength region of 700 nm or more, i.e., from the near infrared region to the infrared region, include those described in JP-A-47-840, JP-A-47-44180, JP-B-51-41061, JP-A-49-5034, JP-A-49-45122, JP-A57-46245, JP-A-56-35141, JP-A-57-157254, JP-A-61-26044, JP-A-61-27551, U.S. Pat. Nos. 3,619,154 and 4,175,956, and *Research Disclosure*, 216, pp. 117–118 (1982).

The light-sensitive material of the present invention is also superior in that the performance properties tend not to vary even when combined with various kinds of sensitizing dyes.

If desired, the photoconductive layer may further contain various additives commonly employed in an electrophotographic photoconductive layer, such as chemical sensitizers. Examples of such additives include electron-accepting compounds (e.g., halogen, benzoquinone, chloranil, acid anhydrides, and organic carboxylic acids) described in *Imaging*, Vol. 1973, No. 8, p. 12 supra; and polyarylalkane compounds, hindered phenol compounds, and p-phenylenediamine compounds described in Hiroshi Kokado, et al., *Saikin-no Kododen Zairyo to Kankotai no Kaihatsu Jitsuyoka*, Chs. 4–6, Nippon Kagaku Joho K.K. (1986).

The amount of these additives is not particularly critical and usually ranges from 0.0001 to 2.0 parts by weight per 100 parts by weight of the photoconductive particles.

The photoconductive layer of the light-sensitive material suitably has a thickness of from 1 to 100 $\mu$m, particularly from 10 to 50 $\mu$m.

Where the photoconductive layer functions as a charge generating layer in a laminated light-sensitive material comprising a charge generating layer and a charge transporting layer, the thickness of the charge generating layer suitably ranges from 0.01 to 1 $\mu$m, particularly from 0.05 to 0.5 $\mu$m.

Charge transporting materials useful in the above-described laminated type light-sensitive material include polyvinylcarbazole, oxazole dyes, pyrazoline dyes, and triphenylmethane dyes but can be any of the known charge transporting materials. The thickness of the charge transporting layer ranges from 5 to 40 $\mu$m, and preferably from 10 to 30 $\mu$m.

Resins which can be used in an insulating layer or the charge transport layer typically include thermoplastic and thermosetting resins, e.g., polystyrene resins, polyester resins, cellulose resins, polyether resins, vinyl chloride resins, vinyl acetate resins, vinyl chloride-vinyl acetate copolymer resins, polyacrylate resins, polyolefin resins, urethane resins, epoxy resins, melamine resins, and silicone resins.

The photoconductive layer according to the present invention can be formed on any known support. In general, a support for an electrophotographic light-sensitive material is preferably electrically conductive. Any of conventionally employed conductive supports may be utilized in this invention. Examples of usable conductive supports include a base, e.g., a metal sheet, paper, and a synthetic resin sheet, having been rendered electrically conductive by, for example, impregnation with a low resistant substance; the above-described base with the back side thereof (opposite to the photoconductive layer) being rendered conductive and having further coated thereon at least one layer for the purpose of prevention of curling; the above-described supports having thereon a water-resistant adhesive layer; the above-described supports having thereon at least one precoat layer; and paper laminated with a synthetic resin film on which aluminum, etc. is deposited.

Specific examples of conductive supports and materials for imparting conductivity are described in Yukio Sakamoto, *Denshishashin*, Vol. 14, No. 1, pp. 2-11 (1975), Hiroyuki Moriga, *Nyumon Tokushushi no Kagaku*, Kobunshi Kankokai (1975), and M. F. Hoover, *J. Macromol. Sci. Chem.*, A-4(6), pp. 1327–1417 (1970).

The present invention will now be illustrated in greater detail by way of Synthesis Examples, Examples, and Comparative Examples, but it should be understood that the present invention is not deemed to be limited thereto. Unless otherwise indicated herein, all parts, percents, ratios and the like are by weight, and all average molecular weights are weight average molecular weights.

SYNTHESIS EXAMPLE 1 OF MACROMONOMER

Synthesis of Macromonomer MM-1

A mixture of 90.1 g of 1,4-butanediol, 105.1 g of succinic anhydride, 1.6 g of p-toluenesulfonic acid monohydrate, and 200 g of toluene was heated at reflux with stirring for 4 hours in a flask equipped with a Dean-Stark refluxing condenser. The amount of water azeotropically distilled with toluene was 17.5 g.

A mixture of 17.2 g of acrylic acid and 150 g of toluene and 1.0 g of t-butylhydroquinone were added to the reaction mixture, and the reaction was continued at reflux with stirring for 4 hours. After cooling to room temperature, the reaction mixture was precipitated in 2 l of methanol. The thus precipitate solid was collected by filtration and dried under reduced pressure to obtain 135 g of the entitled macromonomer (MM-1) having a weight average molecular weight of $6.8 \times 10^3$.

(MM-1):

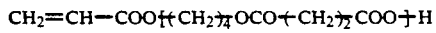

$CH_2=CH-COO(CH_2)_4OCO(CH_2)_2COO)H$

SYNTHESIS EXAMPLE 2 OF MACROMONOMER

Synthesis of Macromonomer MM-2

A mixture of 120 g of 1,6-hexanediol, 114.1 g of glutaric acid anhydride, 3.0 g of p-toluenesulfonic acid monohydrate, and 250 g of toluene was allowed to react under the same conditions as in Synthesis Example 1 of Macromonomer. The amount of water azeotropically distilled was 17.5 g.

After cooling to room temperature, the reaction mixture was precipitated in 2 l of n-hexane and, after removing a liquid phase by decantation, the solid precipitated was collected and dried under reduced pressure.

The resulting reaction product was dissolved in toluene, and the carboxyl group content of the product was determined by neutralization titration with a 1N methanol solution of potassium hydroxide and was found to be 500 μmol/g.

A mixture of 100 g of the resulting solid, 8.6 g of methacrylic acid, 1.0 g of t-butylhydroquinone, and 200 g of methylene chloride was stirred at room temperature to dissolve the solid.

A mixture of 20.3 g of dicyclohexylcarbodiimide (hereinafter abbreviated as DCC), 0.5 g of 4-(N,N-dimethyl)-aminopyridine, and 100 g of methylene chloride was added dropwise to the above-prepared mixture with stirring over a period of 1 hour. After the addition, the stirring was continued for an additional period of 4 hours.

According as the DCC solution was added dropwise, insoluble crystals precipitated. The reaction mixture was filtered through nylon cloth of 200 mesh to remove any insoluble matter.

The filtrate was re-precipitated in 2 l of hexane, and the powder thus precipitated was collected by filtration. To the powder was added 500 ml of acetone, followed by stirring for 1 hour. Any insoluble matter was separated by gravity filtration through filter paper. The filtrate was concentrated under reduced pressure to ½ of the original volume, and the concentrated solution was added to 1 l of diethyl ether, followed by stirring for 1 hour. The thus precipitated solid was collected by filtration and dried under reduced pressure to obtain 53 g of the entitled macromonomer (MM-2) having a weight average molecular weight of $8.2 \times 10^3$.

(MM-2):

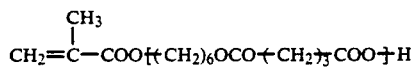

$$CH_2=\overset{CH_3}{\underset{|}{C}}-COO(CH_2)_6OCO(CH_2)_3COO)H$$

SYNTHESIS EXAMPLE 3 OF MACROMONOMER

Synthesis of Macromonomer MM-3

In an oil bath kept at an outer temperature of 150° C., 500 g of 12-hydroxystearic acid was stirred under reduced pressure of 10 to 15 mmHg for 10 hours while removing water produced by distillation.

The resulting liquid had a carboxyl group content of 600 μmol/g. A mixture of 100 g of the liquid, 18.5 g of methacrylic anhydride, 1.5 g of t-butylhydroquinone, and 200 g of tetrahydrofuran was stirred at a temperature between 40° and 45° C. for 6 hours. The reaction mixture was added dropwise to 1 l of water while stirring over a period of 1 hour. After the addition, the stirring was continued for an additional one hour. The reaction mixture was allowed to stand still, and the sedimented liquid was separated by decantation, dissolved in 200 g of tetrahydrofuran, and re-precipitated in 1 l of methanol. The sedimented liquid was separated by decantation and dried under reduced pressure to obtain 62 g of the entitled macromonomer (MM-3) having a weight average molecular weight of $6.7 \times 10^3$.

(MM-3):

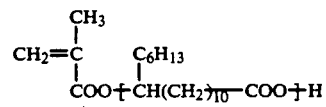

$$CH_2=\overset{CH_3}{\underset{|}{C}}\quad \overset{}{\underset{}{C_6H_{13}}}$$
$$COO(CH(CH_2)_{10}-COO)H$$

SYNTHESIS EXAMPLE 4 OF MACROMONOMER

Synthesis of Macromonomer MM-4

A macromonomer having the following structure (MM-4) was synthesized according to the process described in S. Penczek, et al., *Makromol. Chem.*, Vol. 188, p. 1347 (1987).

(MM-4):

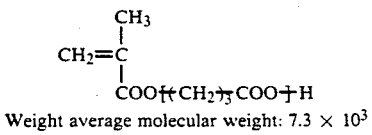

Weight average molecular weight: 7.3 × 10³

SYNTHESIS EXAMPLE 5 OF MACROMONOMER

Synthesis of Macromonomer MM-5

A mixture of 90.1 g of 1,4-butanediol, 105.1 g of succinic anhydride, 1.6 g of p-toluenesulfonic acid monohydrate, and 200 g of toluene was heated at reflux for 4 hours with stirring in a flask equipped with a Dean-Stark reflux condenser. The amount of water azeotropically distilled off with toluene was 17.5 g.

A mixture of 21.2 g of 2-hydroxyethyl methacrylate and 150 g of toluene and 1.0 g of t-butylhydroquinone were added to the reaction product, and a mixture of 33.5 g of DCC, 1.0 g of 4-(N,N-dimethylamino)pyridine, and 100 g of methylene chloride was added thereto dropwise over 1 hour while stirring. After the addition, the stirring was further continued for 4 hours.

The reaction mixture was filtered through nylon cloth of 200 mesh to remove any insoluble matter. The filtrate was precipitated in 3 l of methanol to collect a powder. The powder was dissolved in 200 g of methylene chloride and re-precipitated in 3 l of methanol. The precipitated powder was collected by filtration and dried under reduced pressure to obtain 103 g of the entitled macromonomer (MM-5) having a weight average molecular weight of 6.3 × 10³.

(MM-5):

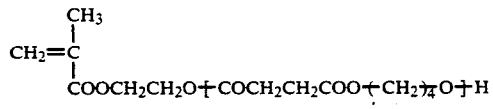

SYNTHESIS EXAMPLE 6 OF MACROMONOMER

Synthesis of Macromonomer MM-6

A mixture of 120 g of 1,6-hexanediol, 114.1 g of glutaric anhydride, 3.0 g of p-toluenesulfonic acid monohydrate, and 250 g of toluene was allowed to react under the same conditions as in Synthesis Example 5 of Macromonomer. The amount of water azeotropically distilled off with toluene was 17.5 g.

After cooling to room temperature, the reaction mixture was precipitated in 2 l of n-hexane and, after removing the liquid phase by decantation, the precipitated solid was dried under reduced pressure.

The resulting reaction product was dissolved in toluene, and the carboxyl group content was determined by neutralization titration with a 0.1N methanol solution of potassium hydroxide and was found to be 500 μmol/g.

A mixture of 100 g of the solid, 10.7 g of glycidyl methacrylate, 1.0 g of t-butylhydroquinone, 1.0 g of N,N-dimethyldodecylamine, and 200 g of xylene was stirred at 140° C. for 5 hours. After cooling, the reaction mixture was precipitated in 3 l of n-hexane. The liquid phase was removed by decantation, and the precipitated solid was collected and dried under reduced pressure to obtain 63 g of the entitled macromonomer (MM-6) having an average molecular weight of 7.6 × 10³.

The residual carboxyl group content of the macromonomer obtained was found to be 8 μmol/g as determined in the same manner as described above, indicating the rate of reaction of 99.8%.

(MM-6):

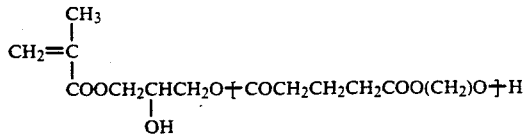

SYNTHESIS EXAMPLE 7 OF MACROMONOMER

Synthesis of Macromonomer MM-7

To a mixture of 100 g of the polyester oligomer obtained in Synthesis Example 6 of Macromonomer, 200 g of methylene chloride, and 1 ml of dimethylformamide was added dropwise 15 g of thionyl chloride at 25° to 30° C. while stirring. After the addition, the stirring was continued for an additional period of 2 hours. Methylene chloride and excess thionyl chloride were removed by distillation under reduced pressure by using an aspirator, and the residue was dissolved in 200 g of tetrahydrofuran and 11.9 g of pyridine. To the solution was added dropwise 8.7 g of allyl alcohol at 25° to 30° C. while stirring. After the addition, the stirring was continued for 3 hours. The reaction mixture was poured into 1 l of water, followed by stirring for 1 hour. After allowing the mixture to stand, the sedimented liquid phase was collected by decantaiton. To the liquid product was poured 1 l of water, followed by stirring for 30 minutes. After allowing the mixture to stand, the liquid product thus sedimented was collected by decantation. The aforesaid operation was repeatedly carried out until the supernatant liquor became neutral. Then, 500 ml of diethyl ether was added to the resulting liquid product, followed by stirring to form a solid, which was collected and dried under reduced pressure to obtain 59 g of the entitled macromonomer (MM-7) having an average molecular weight of 7.7 × 10³.

(MM-7):

SYNTHESIS EXAMPLE 8 OF MACROMONOMER

Synthesis of Macromonomer MM-8

In an oil bath kept at an outer temperature of 150° C. was stirred 500 g of 12-hydroxystearic acid under reduced pressure of 10 to 15 mmHg for 10 hours while removing water produced by distillation. The resulting liquid product had a carboxyl group content of 600 μmol/g.

To a mixture of 100 g of the liquid product, 13.9 g of 2-hydroxyethyl acrylate, 1.5 g of t-butylhydroquinone, and 200 g of methylene chloride was added dropwise a mixture of 24.8 g of DCC, 0.8 g of 4-(N,N-dimethyl)aminopyridine, and 100 g of methylene chloride at room temperature over 1 hour while stirring. After the addition, the stirring was continued for 4 hours. The reaction mixture was filtered through nylon cloth of 200 mesh to separate any insoluble matter. The filtrate was concentrated under reduced pressure, and 300 g of n-hexane was added to the residue, followed by stirring. Any insoluble matter was removed by filtration through filter paper. The filtrate was concentrated, and 100 g of tetrahydrofuran was added to the residue. The resulting solution was re-precipitated in 1 l of methanol, and the sedimented liquid product was collected by decantation and dried under reduced pressure to obtain 60 g of the entitled macromonomer (MM-8) having an average molecular weight of $6.7 \times 10^3$.

(MM-8):

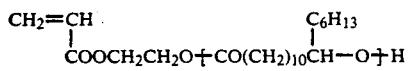

SYNTHESIS EXAMPLE 1 OF RESIN (A)

Synthesis of Resin A-1

A mixture of 60 g of benzyl methacrylate, 40 g of MM-2 obtained in Synthesis Example 2 of Macromonomer, and 200 g of toluene was heated to 90° C. in a nitrogen stream. To the mixture was added 6.0 g of 2,2'-azobisisobutyronitrile (hereinafter abbreviated as AIBN), followed by stirring for 4 hours. To the mixture was further added 2 g of AIBN, followed by stirring for 2 hours, and then 1 g of AIBN was furthermore added thereto, followed by stirring for 3 hours to obtain a copolymer (A-1) having an average molecular weight of $9.5 \times 10^3$.

(A-1):

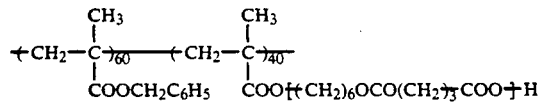

SYNTHESIS EXAMPLE 2 OF RESIN (A)

Synthesis of Resin A-2

A mixture of 50 g of benzyl methacrylate, 50 g of MM-2 prepared in Synthesis Example 2 of Macromonomer, 1.0 g of n-dodecylmercaptan, and 200 g of toluene was heated to 75° C. in a nitrogen stream.

To the mixture was added 1.0 g of AIBN, followed by stirring for 4 hours. To the mixture was further added 0.4 g of AIBN, followed by stirring for 2 hours, and then 0.2 g of AIBN was furthermore added thereto, followed by stirring for 3 hours to obtain a copolymer (A-2) having a weight average molecular weight of $7.5 \times 10^3$.

(A-2):

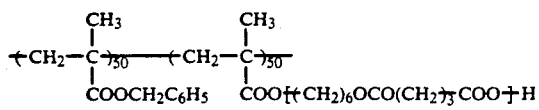

SYNTHESIS EXAMPLE 3 OF RESIN A

Synthesis of Resin A-3

A mixture of 47 g of benzyl methacrylate, 50 g of MM-3 prepared in Synthesis Example 3 of Macromonomer, 3.0 g of thioglycolic acid, and 200 g of toluene was heated to 75° C. in a nitrogen stream.

To the mixture was added 1.5 g of AIBN, followed by stirring for 4 hours. To the mixture was further added 0.4 g of AIBN, followed by stirring for 2 hours, and then 0.2 g of AIBN was furthermore added thereto, followed by stirring for 3 hours to obtain a copolymer (A-3) having a weight average molecular weight of $7.0 \times 10^3$.

(A-3):

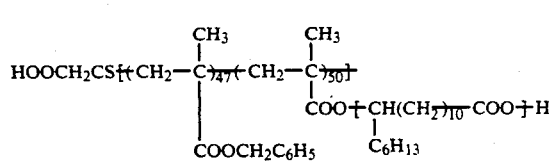

SYNTHESIS EXAMPLE 4 OF RESIN (A)

Synthesis of resin A-4

A mixture of 60 g of 2-chlorophenyl methacrylate, 40 g of MM-4 prepared in Synthesis Example 4 of Macromonomer, 150 g of toluene, and 50 g of isopropyl alcohol was heated to 85° C. in a nitrogen stream.

To the mixture was added 5.0 g of 4,4'-azobis(2-cyanovaleric acid) (hereinafter abbreviated as ACV), followed by stirring for 4 hours. To the mixture was further added 1 g of ACV, followed by stirring for 2 hours, and then 1 g of ACV was furthermore added thereto, followed by stirring for 3 hours to obtain a copolymer (A-4) having a weight average molecular weight of $8.5 \times 10^3$.

(A-4):

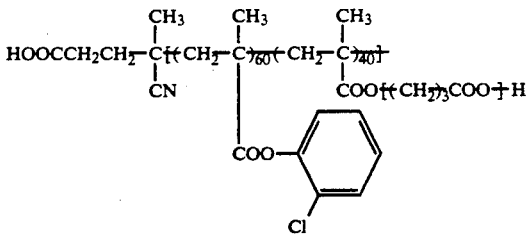

SYNTHESIS EXAMPLES 5 TO 14 OF RESIN (A)

Synthesis of Resins A-5 to A-14

Resins (A) shown in Table 1 below were prepared in the same manner as in Synthesis Example 1 of Resin (A). The resulting resins had a weight average molecular weight of from $5 \times 10^3$ to $1.5 \times 10^4$. In Table 1, Mw means a weight average molecular weight (hereinafter the same).

TABLE 1

$$+CH_2-\underset{\underset{COOR}{|}}{\overset{\overset{CH_3}{|}}{C}})_x-(CH_2-\underset{\underset{CO+O-W-CO+OH}{|}}{\overset{\overset{CH_3}{|}}{C}})_y-$$

| Resin (A) | R | x/y (by weight) | Mw of Macromonomer | —W— |
|---|---|---|---|---|
| A-5 | —C$_2$H$_5$ | 60/40 | 7.5 × 10$^3$ | —CH$_2$—C(CH$_3$)(CH$_3$)—CH$_2$OCO(CH$_2$)$_2$— |
| A-6 | —CH$_2$C$_6$H$_5$ | " | 5.8 × 10$^3$ | —CH$_2$—C(C$_2$H$_5$)(C$_2$H$_5$)—CH$_2$OCO(CH$_2$)$_2$— |
| A-7 | —C$_2$H$_5$ | 70/30 | 6.2 × 10$^3$ | —CH$_2$—C$_6$H$_4$—CH$_2$OCO(CH$_2$)$_6$— |
| A-8 | 2-naphthyl | 50/50 | 7.0 × 10$^3$ | —CH$_2$—CH(CH$_3$)—CH$_2$—OCO(CH$_2$)$_3$— |
| A-9 | 2-chlorophenyl | 80/20 | 3.2 × 10$^3$ | —(CH$_2$)$_6$OCOCH$_2$CH(C$_2$H$_5$)— |
| A-10 | 2-methylphenyl | 50/50 | 4.5 × 10$^3$ | —(CH$_2$)$_4$OCOCH$_2$—C$_6$H$_4$—CH$_2$— |
| A-11 | 2-chloro-3-methylphenyl | 80/20 | 6.7 × 10$^3$ | —CH(C$_6$H$_{13}$)—(CH$_2$)$_{10}$— |
| A-12 | —CH$_2$-(2-naphthyl) | 80/20 | 7.3 × 10$^3$ | —(CH$_2$)$_{12}$— |
| A-13 | —CH$_2$C$_6$H$_5$ | 75/25 | 6.8 × 10$^3$ | —CH$_2$—C(CH$_3$)(CH$_3$)— |
| A-14 | —CH$_2$-(2-methylphenyl) | 60/40 | 4.6 × 10$^3$ | —CH$_2$CH=CH—CH$_2$OCO(CH$_2$)— |

TABLE 1-continued $$+CH_2-\underset{\underset{COOR}{|}}{\overset{\overset{CH_3}{|}}{C}})_x-(CH_2-\underset{\underset{CO+O-W-CO+OH}{|}}{\overset{\overset{CH_3}{|}}{C}})_y-$$

| Resin (A) | R | x/y (by weight) | Mw of Macromonomer | —W— |
|---|---|---|---|---|
| A-15 | 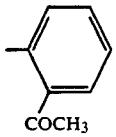 (2-acetylphenyl, COCH₃) | 55/45 | $3.8 \times 10^3$ | —(CH$_2$)$_2$O(CH$_2$)OCO(CH$_2$)$_2$— |

SYNTHESIS EXAMPLES 16 TO 25 OF RESIN (A)

Synthesis of Resins A-16 to A-25

Resins (A) shown in Table 2 below were prepared in the same manner as in Synthesis Example 3 of Resin (A), except for replacing thioglycolic acid used as a chain transfer agent with another mercapto compound. The resulting resins (A) had a weight average molecular weight (Mw) of from $5.0 \times 10^3$ to $1.5 \times 10^4$.

TABLE 2

$$R'-S-(CH_2-\underset{\underset{COOR}{|}}{\overset{\overset{CH_3}{|}}{C}})_x-(CH_2-\underset{\underset{COO(CH_2)_2CO+O-W-CO+OH}{|}}{\overset{\overset{CH_3}{|}}{C}})_y-$$

| Resin (A) | R' | R | x/y (by weight) | Mw of Macromonomer | —W— |
|---|---|---|---|---|---|
| [A]-16 | HOOC—HC—<br>      \|<br>HOOC—CH$_2$ | —CH$_2$C$_6$H$_5$ | 85/15 | $7.0 \times 10^3$ | —(CH$_2$)$_6$OCO(CH$_2$)$_3$— |
| -17 | HOOCH$_2$C—H$_2$C— | " | 80/20 | $5.8 \times 10^3$ | —CH$_2$—C(C$_2$H$_5$)$_2$—CH$_2$OCO(CH$_2$)$_2$— |
| -18 | HOOC(CH$_2$)$_2$CONH(H$_2$C)$_2$— | —C$_2$H$_5$ | 70/30 | $7.2 \times 10^3$ | —(CH$_2$)$_4$OCO(CH$_2$)$_2$— |
| -19 | HO(CH$_2$)$_2$— | 2-chlorophenyl | 60/40 | $4.5 \times 10^3$ | —(CH$_2$)$_4$OCO(CH$_2$)$_4$— |
| -20 | HO—P(=O)(OH)—O(CH$_2$)$_2$— | 3-bromophenyl | 85/15 | $7.5 \times 10^3$ | —(CH$_2$)$_8$OCOCH=CH— |
| -21 | HO$_3$S(CH$_2$)$_2$— | 3-methyl-4-chlorophenyl | 90/10 | $3.8 \times 10^3$ | —(CH$_2$)$_3$OCOCH$_2$CH(C$_4$H$_9$)— |
| [A]-22 | phthalic anhydride-CONH(CH$_2$)$_2$— | phenyl | 70/30 | $6.8 \times 10^3$ | —CH(CH$_2$)$_8$—<br>    \|<br>    C$_4$H$_9$ |

TABLE 2-continued $$R'-S-(CH_2-\underset{\underset{COOR}{|}}{\overset{\overset{CH_3}{|}}{C}})_x-(CH_2-\underset{\underset{COO(CH_2)_2CO+O-W-CO+OH}{|}}{\overset{\overset{CH_3}{|}}{C}})_y-$$

| Resin (A) | R' | R | x/y (by weight) | Mw of Macromonomer | —W— |
|---|---|---|---|---|---|
| -23 | ![benzoic acid] | —CH₂C₆H₅ | 80/20 | 4.8 × 10³ | —(CH₂)₆OCO+CH₂)₄— |
| -24 | C₂H₅O—P(=O)(OH)—O(CH₂)₂— | —CH₂—(2,6-dimethylphenyl) | 70/30 | 7.3 × 10³ | —CH₂CH(C₂H₅)—CH₂OCO(CH₂)₂— |
| -25 | ![o-COOH benzyl] | —C₂H₅ | 75/25 | 6.5 × 10³ | —CH₂—(p-C₆H₄)—CH₂OCO(CH₂)₃— |

SYNTHESIS EXAMPLE 26 OF RESIN (A)

Synthesis of Resin-26

A mixture of 70 g of benzyl methacrylate, 30 g of MM-5 prepared in Synthesis Example 5 of Macromonomer, 150 g of toluene, and 50 g of isopropyl alcohol was heated to 80° C. in a nitrogen stream.

To the mixture was added 5.0 g of ACV, followed by stirring for 3 hours. To the mixture was further added 1.0 g of ACV, followed by stirring for 2 hours, and then 0.5 g of ACV was furthermore added thereto, followed by stirring for 3 hours to obtain a copolymer (A-27) having a weight average molecular weight of $8.3 \times 10^3$.

(A-27):

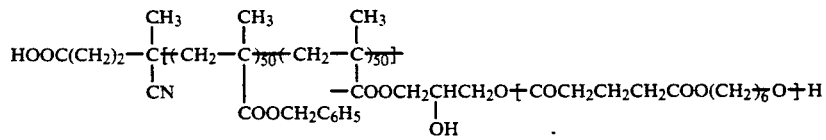

To the mixture was added 5.0 g of ACV, followed by stirring for 4 hours. To the mixture was further added 0.4 g of AVC, followed by stirring for 2 hours, and then 0.2 g of AVC was furthermore added thereto, followed by stirring for 3 hours to obtain a copolymer (A-26) having a weight average molecular weight of $8.5 \times 10^3$.

(A-26):

SYNTHESIS EXAMPLE 28 OF RESIN (A)

Synthesis of Resin A-28

A mixture of 50 g of 2,6-dichlorophenyl methacrylate, 50 g of MM-5 prepared in Synthesis Example 5 of Macromonomer, 3.0 g of thioglycolic acid, and 200 g of toluene was heated to 75° C. in a nitrogen stream.

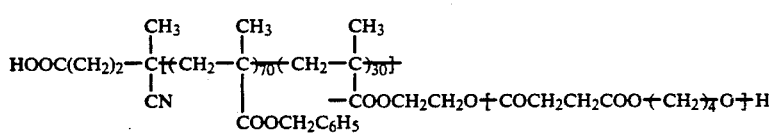

SYNTHESIS EXAMPLE 27 OF RESIN (A)

Synthesis of Resin A-27

A mixture of 50 g of benzyl methacrylate, 50 g of MM-6 prepared in Synthesis Example 6 of Macromonomer, 150 g of toluene, and 50 g of isopropyl alcohol was heated to 90° C. in a nitrogen stream.

To the mixture was added 1.0 g of AIBN, followed by stirring for 4 hours. To the mixture was further added 0.4 g of AIBN, followed by stirring for 2 hours, and then 0.2 g of AIBN was furthermore added thereto, followed by stirring for 3 hours to obtain a copolymer (A-28) having a weight average molecular weight of $7.5 \times 10^3$.

(A-28):

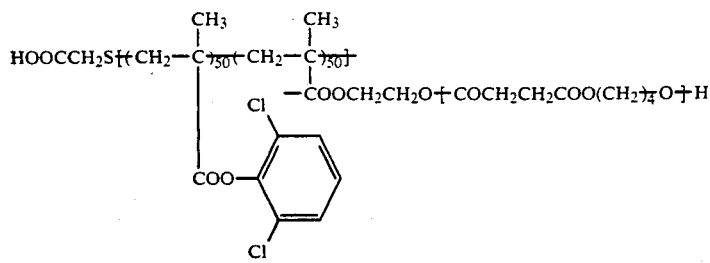

SYNTHESIS EXAMPLE 29 OF RESIN (A)

Synthesis of Resin A-29

A mixture of 70 g of 2-chlorophenyl methacrylate, 30 g of MM-8 prepared in Synthesis Example 8 of Macromonomer, 3.0 g of thioglycolic acid, and 200 g of toluene was heated to 75° C. in a nitrogen stream.

To the mixture was added 1.5 g of AIBN, followed by stirring for 4 hours. To the mixture was further added 0.4 g of AIBN, followed by stirring for 2 hours, and then 0.2 g of AIBN was furthermore added thereto, followed by stirring for 3 hours to obtain a copolymer (A-29) having a weight average molecular weight of $7.0 \times 10^3$.

(A-29):

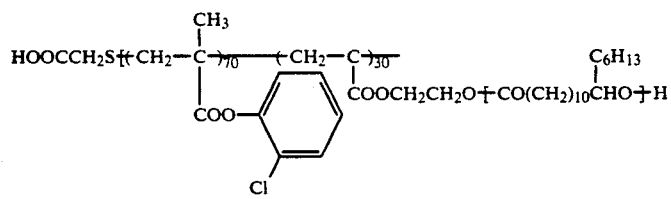

SYNTHESIS EXAMPLE 30 OF RESIN (A)

Synthesis of Resin A-30

A mixture of 80 g of n-butyl methacrylate, 20 g of MM-7 prepared in Synthesis Example 7 of Macromonomer, and 200 g of toluene was heated to 80° C. in a nitrogen stream.

To the mixture was added 6.0 g of AIBN, followed by stirring for 4 hours. To the mixture was further added 3 g of AIBN, followed by stirring for 2 hours, and then 1 g of AIBN was furthermore added thereto, followed by stirring for 3 hours to obtain a copolymer (A-30) having a weight average molecular weight of $7.8 \times 10^3$.

(A-30):

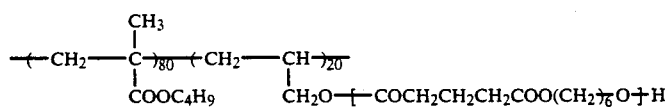

SYNTHESIS EXAMPLES 31 TO 40 OF RESIN (A)

Synthesis of Resins A-31 to A-40

Resins (A) shown in Table 3 below were prepared in the same manner as in Synthesis Example 26 of Resin (A). The resulting resins had a weight average molecular weight of from $5 \times 10^3$ to $8 \times 10^3$.

TABLE 3

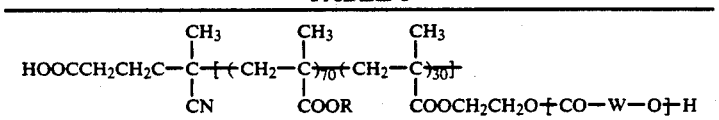

| Resin (A) | R | —W— |
|---|---|---|
| A-31 | —CH$_3$ | —CH$_2$CH$_2$CH$_2$COOCH$_2$C(CH$_3$)(CH$_3$)—CH$_2$— |
| A-32 | —C$_2$H$_5$ | —CH$_2$CH$_2$COOCH$_2$CH(C$_2$H$_5$)CH$_2$— |

TABLE 3-continued $$\text{HOOCCH}_2\text{CH}_2\text{C}-\underset{\underset{\text{CN}}{|}}{\overset{\overset{\text{CH}_3}{|}}{\text{C}}}-[(\text{CH}_2-\underset{\underset{\text{COOR}}{|}}{\overset{\overset{\text{CH}_3}{|}}{\text{C}}})_{70}(\text{CH}_2-\underset{\underset{\text{COOCH}_2\text{CH}_2\text{O}+\text{CO}-\text{W}-\text{O}+\text{H}}{|}}{\overset{\overset{\text{CH}_3}{|}}{\text{C}}})_{30}]$$

| Resin (A) | R | —W— |
|---|---|---|
| A-33 | (2-methylphenyl) | $-(\text{CH}_2)_{10}\underset{\underset{\text{C}_6\text{H}_{13}}{|}}{\text{CH}}-$ |
| A-34 | " | $-\text{CH}_2\text{CH}_2-\text{COO}(\text{CH}_2)_4$ |
| A-35 | (2-methyl-6-chlorophenyl) | $-\text{CH}_2\text{CH}_2\text{COOCH}_2-\underset{\underset{\text{C}_2\text{H}_5}{|}}{\overset{\overset{\text{C}_2\text{H}_5}{|}}{\text{C}}}-\text{CH}_2-$ |
| A-36 | —CH$_3$ | —CH$_2$CH$_2$COOCH$_2$CH$_2$OCH$_2$CH$_2$— |
| A-37 | (2,6-dichlorophenyl) | $-(\text{CH}_2)_4\text{COO}\underset{\underset{\text{CH}_3}{|}}{\text{CH}}-$ |
| A-38 | —CH$_2$C$_6$H$_5$ | $-\underset{\underset{\text{CH}_3}{|}}{\overset{\overset{\text{CH}_3}{|}}{\text{C}}}-\text{CH}_2-$ |
| A-39 | (2-acetylphenyl) | $-(\text{CH}_2)_2\text{COO}-(\text{CH}_2)_6$ |
| A-40 | —CH$_2$—(2-methylphenyl) | $-\text{CH}=\text{CH}-\text{COO}-\text{CH}_2-\underset{\underset{\text{CH}_3}{|}}{\text{CH}}-\text{CH}_2-$ |

SYNTHESIS EXAMPLES 41 TO 46

Synthesis of Resins A-41 to A-46

Resins (A) shown in Table 4 below were prepared in the same manner as in Synthesis Example 28 of Resin (A), except for replacing 3 g of thiglycolic acid used as a chain transfer agent with the same amount of each of the mercapto compounds shown in Table 4.

TABLE 4

| Resin (A) | Chain Transfer Agent | Weight Average Molecular Weight |
|---|---|---|
| A-41 | HS(CH$_2$)$_2$—COOH | 8,300 |
| A-42 | HS—CH(CH$_2$—COOH)—COOH | 7,600 |
| A-43 | HS—C$_6$H$_4$—COOH (ortho) | 7,700 |
| A-44 | HSCH$_2$CH$_2$SO$_3$H | 7,600 |
| A-45 | HS(CH$_2$)$_3$O—P(=O)(OH)—OH | 7,800 |

TABLE 4-continued

| Resin (A) | Chain Transfer Agent | Weight Average Molecular Weight |
|---|---|---|
| A-46 | 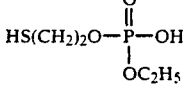 | 8,000 |

SYNTHESIS EXAMPLES 48 AND 49 OF RESIN (A)

Synthesis of Resins A-48 and A-49

Resins A-48 and A-49 shown below were prepared in the same manner as in Synthesis Example 28 of Resin (A).

(A-48):

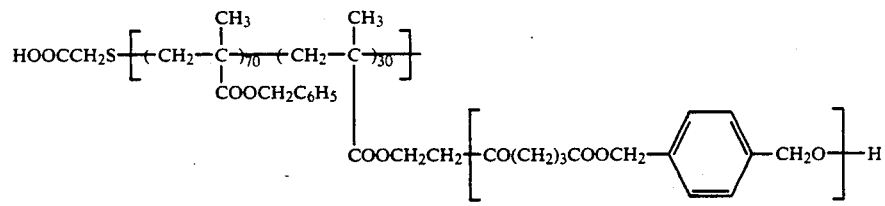

Weight average molecular weight: $8.6 \times 10^3$ (A-49):

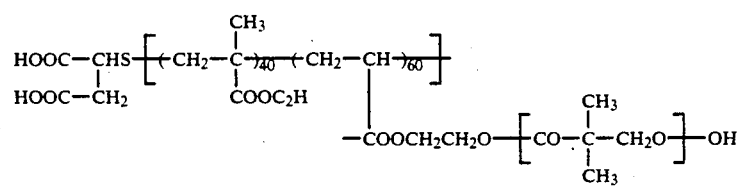

Weight average molecular weight: $8.1 \times 10^3$

SYNTHESIS EXAMPLE 47 OF RESIN (A)

Synthesis of Resin A-47

A mixture of 50 g of 2,6-dichlorophenyl methacrylate, 50 g of MM-5 obtained in Synthesis Example 5 of Macromonomer, 2 g of thioglycolic acid, 150 g of toluene, and 50 g of ethanol was heated to 80° C. in a nitrogen stream. To the mixture was added 3 g of ACV to conduct a reaction for 4 hours, and 1.0 g of ACV was further added, followed by reacting for 4 hours to obtain a copolymer (A-47) having a weight average molecular weight of $8.5 \times 10^3$.

(A-47):

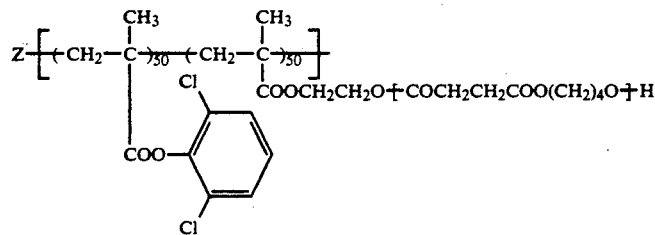

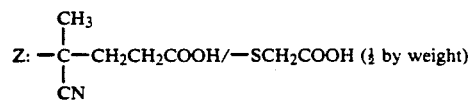

SYNTHESIS EXAMPLE 1 OF RESIN (B)

Synthesis of Resin B-1

A mixture of 100 g of ethyl methacrylate, 1.0 g of ethylene glycol dimethacrylate, and 200 g of toluene was heated to 75° C. in a nitrogen stream, and 1.0 g of AIBN was added thereto to conduct a reaction for 10 hours. The resulting copolymer (B-1) had a weight average molecular weight of $4.2 \times 10^5$.

SYNTHESIS EXAMPLES 2 TO 19 OF RESIN (B)

Synthesis of Resins B-2 to B-19

Resins (B) shown in Table 5 were prepared in the same manner as in Synthesis Example 1 of Resin (B), except for using the monomer and crosslinking monomer shown in Table 5.

TABLE 5

| Synthesis Example No. | Resin (B) | Monomer | Crosslinking Monomer | Mw of Resin (B) |
|---|---|---|---|---|
| 2 | B-2 | ethyl methacrylate (100 g) | propylene glycol dimethacrylate (1.0 g) | $2.4 \times 10^5$ |
| 3 | B-3 | butyl methacrylate (100 g) | diethylene glycol dimethacrylate (0.8 g) | $3.4 \times 10^5$ |
| 4 | B-4 | propyl methacrylate (100 g) | vinyl methacrylate (3 g) | $9.5 \times 10^5$ |
| 5 | B-5 | methyl methacrylate (80 g) ethyl acrylate (20 g) | divinylbenzene (0.8 g) | $8.8 \times 10^5$ |
| 6 | B-6 | ethyl methacrylate (75 g) methyl acrylate (25 g) | diethylene glycol diacrylate (0.8 g) | $2.0 \times 10^5$ |
| 7 | B-7 | styrene (20 g) butyl methacrylate (80 g) | triethylene glycol trimethacrylate (0.5 g) | $3.3 \times 10^5$ |
| 8 | B-8 | methyl methacrylate (40 g) propyl methacrylate (60 g) | IPS-22GA (produced by Okamura Seiyu K. K.) (0.9 g) | $3.6 \times 10^5$ |
| 9 | B-9 | benzyl methacrylate (100 g) | ethylene glycol dimethacrylate (0.8 g) | $2.4 \times 10^5$ |
| 10 | B-10 | butyl methacrylate (95 g) 2-hydroxyethyl methacrylate (5 g) | ethylene glycol dimethacrylate (0.8 g) | $2.0 \times 10^5$ |
| 11 | B-11 | ethyl methacrylate (90 g) acrylonitrile (10 g) | divinylbenzene (0.7 g) | $1.0 \times 10^5$ |
| 12 | B-12 | ethyl methacrylate (99.5 g) methacrylic acid (0.5 g) | triethylene glycol dimethacrylate (0.8 g) | $1.5 \times 10^5$ |
| 13 | B-13 | butyl methacrylate (70 g) phenyl methacrylate (30 g) | diethylene glycol dimethacrylate (1.0 g) | $2.0 \times 10^5$ |
| 14 | B-14 | ethyl methacrylate (95 g) acrylamide (5 g) | triethylene glycol dimethacrylate (1.0 g) | $2.4 \times 10^5$ |
| 15 | B-15 | propyl methacrylate (92 g) N,N-dimethylaminoethyl methacrylate (8 g) | divinylbenzene (1.0 g) | $1.8 \times 10^5$ |
| 16 | B-16 | ethyl methacrylate (70 g) methyl crotonate (30 g) | divinylbenzene (0.8 g) | $1.4 \times 10^5$ |
| 17 | B-17 | propyl methacrylate (95 g) diacetonacrylamide (5 g) | propylene glycol dimethacrylate (0.8 g) | $1.8 \times 10^5$ |
| 18 | B-18 | ethyl methacrylate (93 g) 6-hydroxyhexamethylene methacrylate (7 g) | ethylene glycol dimethacrylate (0.8 g) | $2.0 \times 10^5$ |
| 19 | B-19 | ethyl methacrylate (90 g) 2-cyanoethyl methacrylate (10 g) | ethylene glycol dimethacrylate (0.8 g) | $1.8 \times 10^5$ |

SYNTHESIS EXAMPLE 20 OF RESIN (B)

Synthesis of Resin B-20

A mixture of 99 g of ethyl methacrylate, 1 g of ethylene glycol dimethacrylate, 150 g of toluene, and 50 g of methanol was heated to 70° C. in a nitrogen stream, and 1.0 g of 4,4'-azobis(4-cyanopentanoic acid) was added thereto to conduct a reaction for 8 hours. The resulting copolymer (B-20) had an average molecular weight of $1.0 \times 10^5$.

SYNTHESIS EXAMPLES 21 TO 24 OF RESIN (B)

Synthesis of Resins B-21 to B-24

Resins (B) shown in Table 6 below were prepared in the same manner as in Synthesis Example 20 of Resin (B), except for replacing 4,4'-azobis(4-cyanopentanoic acid) used as a polymerization initiator with each of the compounds shown in Table 6. The resulting resins had an average molecular weight between $1.0 \times 10^5$ and $3 \times 10^5$.

TABLE 6

| | | | R—N=N—R |
|---|---|---|---|
| Synthesis Example No. | Resin (B) | Polymerization Initiator | R— |
| 21 | B-21 | 2,2'-azobis(2-cyanopropanol) | 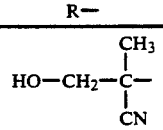 |
| 22 | B-22 | 2,2'-azobis(2-cyanopentanol) | 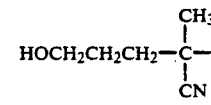 |
| 23 | B-23 | 2,2'-azobis[2-methyl-N-(2-hydroxyethyl)-propionamide] | 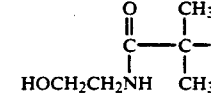 |

TABLE 6-continued

| | | R—N=N—R | |
|---|---|---|---|
| Synthesis Example No. | Resin (B) | Polymerization Initiator | R— |
| 24 | B-24 | 2,2'-azobis{2-methyl-N-[1,1-bis-hydroxymethyl)-2-hydroxyethyl]-propionamide} | $\begin{array}{c} \phantom{HOCH_2-}\phantom{C}\phantom{-}O\phantom{-}CH_3 \\ \phantom{HOCH_2-}\phantom{C}\phantom{-}\|\phantom{-}| \\ HOCH_2-C-C- \\ \phantom{HOH_2C-}\phantom{C}|\phantom{-}| \\ HOH_2C-C-NH\phantom{-}CH_3 \\ \phantom{HOH_2C-}| \\ \phantom{HOH_2C-}HOCH_2 \end{array}$ |

SYNTHESIS EXAMPLE 25 OF RESIN (B)

Synthesis of Resin B-25

A mixture of 99 g of ethyl methacrylate, 1.0 g of thioglycolic acid, 2.0 g of divinylbenzene, and 200 g of toluene was heated to 80° C. with stirring in a nitrogen stream. To the mixture was added 0.8 g of 2,2'-azobis(-cyclohexane-1-carbonitrile) (hereinafter abbreviated as ACHN) to conduct a reaction for 4 hours. Then, 0.4 g of ACHN was added thereto, followed by reacting for 2 hours, and 0.2 g of ACHN was further added thereto, followed by reacting for 2 hours. The resulting polymer (B-25) had a weight average molecular weight of $1.2 \times 10^5$.

SYNTHESIS EXAMPLES 26 TO 38 OF RESIN (B)

Synthesis of Resins B-26 to B-38

Resins (B) shown in Table 7 were prepared in the same manner as in Synthesis Example 25 of Resin (B), except for replacing 2.0 g of divinylbenzene used as a crosslinking polyfunctional monomer with the polyfunctional monomer or oligomer shown in Table 7.

TABLE 7

| Synthesis Example No. | Resin (B) | Crosslinking Monomer or Oligomer | Mw |
|---|---|---|---|
| 26 | B-26 | ethylene glycol dimethacrylate (2.5 g) | $2.2 \times 10^5$ |
| 27 | B-27 | diethylene glycol dimethacrylate (3 g) | $2.0 \times 10^5$ |
| 28 | B-28 | vinyl methacrylate (6 g) | $1.8 \times 10^5$ |
| 29 | B-29 | isopropenyl methacrylate (6 g) | $2.0 \times 10^5$ |
| 30 | B-30 | divinyl adipate (10 g) | $1.0 \times 10^5$ |
| 31 | B-31 | diallyl glutaconate (10 g) | $9.5 \times 10^5$ |
| 32 | B-32 | IPS-22GA (produced by Okamura Seiyu K. K.) (5 g) | $1.5 \times 10^5$ |
| 33 | B-33 | triethylene glycol diacrylate (2 g) | $2.8 \times 10^5$ |
| 34 | B-34 | trivinylbenzene (0.8 g) | $3.0 \times 10^5$ |
| 35 | B-35 | polyethylene glycol #400 diacrylate (3 g) | $2.5 \times 10^5$ |
| 36 | B-36 | polyethylene glycol dimethacrylate (3 g) | $2.5 \times 10^5$ |
| 37 | B-37 | trimethylolpropane triacrylate (0.5 g) | $1.8 \times 10^5$ |
| 38 | B-38 | polyethylene glycol #600 diacrylate (3 g) | $2.8 \times 10^5$ |

SYNTHESIS EXAMPLES 39 TO 49 OF RESIN (B)

Synthesis of Resins B-39 TO B-49

A mixture of 39 g of methyl methacrylate, 60 g of ethyl methacrylate, 1.0 g of each of the mercapto compounds shown in Table 8 below, 2 g of ethylene glycol dimethacrylate, 150 g of toluene, and 50 g of methanol was heated to 70° C. in a nitrogen stream. To the mixture was added 0.8 g of AIBN to conduct a reaction for 4 hours. Then, 0.4 g of AIBN was further added thereto to conduct a reaction for 4 hours. The resulting polymers had a weight average molecular weight of from $9.5 \times 10^4$ to $2 \times 10^5$.

TABLE 8

| Synthesis Example No. | Resin (B) | Mercapto Compound |
|---|---|---|
| 39 | B-39 | $\begin{array}{c} CH_2COOH \\ | \\ HSCHCOOH \end{array}$ |
| 40 | B-40 | HS—⟨benzene ring⟩—COOH (2-mercaptobenzoic acid) |
| 41 | B-41 | $HSCH_2CH_2NH_2$ |
| 42 | B-42 | $\begin{array}{c} \phantom{HSCH_2CH_2O-}O \\ \phantom{HSCH_2CH_2O-}\| \\ HSCH_2CH_2O-P-OH \\ \phantom{HSCH_2CH_2O-P}| \\ \phantom{HSCH_2CH_2O-P-}OH \end{array}$ |
| 43 | B-43 | $\begin{array}{c} \phantom{HSCH_2CH_2O-}O \\ \phantom{HSCH_2CH_2O-}\| \\ HSCH_2CH_2O-P-OH \\ \phantom{HSCH_2CH_2O-P}| \\ \phantom{HSCH_2CH_2O-P-}OC_2H_5 \end{array}$ |
| 44 | B-44 | $HSCH_2CH_2OCO$—⟨benzene ring with phthalic anhydride group⟩ |
| 45 | B-45 | $HSCH_2CH_2COOH$ |
| 46 | B-46 | $HSCH_2CH_2SO_3H \cdot N$⟨pyridine⟩ |
| 47 | B-47 | $HSCH_2CH_2NHCO(CH_2)_3COOH$ |

TABLE 8-continued

| Synthesis Example No. | Resin (B) | Mercapto Compound |
|---|---|---|
| 48 | B-48 | 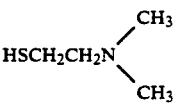 |
| 49 | B-49 | HSCH$_2$CH$_2$OH |

SYNTHESIS EXAMPLE 50 OF RESIN (B)

Synthesis of Resin B-50

A mixture of 100 g of ethyl methacrylate, 1.0 g of ethylene glycol dimethacrylate, and 200 g of toluene was heated to 75° C. in a nitrogen stream, and 1.0 g of AIBN was added thereto to conduct a reaction for 10 hours. The resulting copolymer (B-50) had a weight average molecular weight of $4.2 \times 10^5$.

SYNTHESIS EXAMPLES 51 TO 68 OF RESIN (B)

Synthesis of Resins B-51 to B-68

Resins (B) shown in Table 9 were prepared in the same manner as in Synthesis Example 50 of Resin (B), except for using the monomer and crosslinking monomer shown in Table 9.

TABLE 9

| Synthesis Example No. | Resin (B) | Monomer | Crosslinking Monomer | Mw of Resin (B) |
|---|---|---|---|---|
| 51 | B-51 | ethyl methacrylate (100 g) | propylene glycol dimethacrylate (1.0 g) | $2.4 \times 10^5$ |
| 52 | B-52 | butyl methacrylate (100 g) | diethylene glycol dimethacrylate (0.8 g) | $3.4 \times 10^5$ |
| 53 | B-53 | propyl methacrylate (100 g) | vinyl methacrylate (3 g) | $9.5 \times 10^5$ |
| 54 | B-54 | methyl methacrylate (80 g) ethyl acrylate (20 g) | divinylbenzene (0.8 g) | $8.8 \times 10^5$ |
| 55 | B-55 | ethyl methacrylate (75 g) methyl acrylate (25 g) | diethylene glycol diacrylate (0.8 g) | $2.0 \times 10^5$ |
| 56 | B-56 | styrene (20 g) butyl methacrylate (80 g) | triethylene glycol trimethacrylate (0.5 g) | $3.3 \times 10^5$ |
| 57 | B-57 | methyl methacrylate (40 g) propyl methacrylate (60 g) | IPS-22GA (produced by Okamoto Seiyu K. K.) (0.9 g) | $3.6 \times 10^5$ |
| 58 | B-58 | benzyl methacrylate (100 g) | ethylene glycol dimethacrylate (0.8 g) | $2.4 \times 10^5$ |
| 59 | B-59 | butyl methacrylate (95 g) 2-hydroxyethyl methacrylate (5 g) | ethylene glycol dimethacrylate (0.8 g) | $2.0 \times 10^5$ |
| 60 | B-60 | ethyl methacrylate (90 g) acrylonitrile (10 g) | divinylbenzene (0.7 g) | $1.0 \times 10^5$ |
| 61 | B-61 | ethyl methacrylate (99.5 g) methacrylic acid (0.5 g) | triethylene glycol dimethacrylate (0.8 g) | $1.5 \times 10^5$ |
| 62 | B-62 | butyl methacrylate (70 g) phenyl methacrylate (30 g) | diethylene glycol dimethacrylate (1.0 g) | $2.0 \times 10^5$ |
| 63 | B-63 | ethyl methacrylate (95 g) acrylamide (5 g) | triethylene glycol dimethacrylate (1.0 g) | $2.4 \times 10^5$ |
| 64 | B-64 | propyl methacrylate (92 g) N,N-dimethylaminoethyl methacrylate (8 g) | divinylbenzene (1.0 g) | $1.8 \times 10^5$ |
| 65 | B-65 | ethyl methacrylate (70 g) methyl crotonate (30 g) | divinylbenzene (0.8 g) | $1.4 \times 10^5$ |
| 66 | B-66 | propyl methacrylate (95 g) diacetonacrylamide (5 g) | propylene glycol dimethacrylate (0.8 g) | $1.8 \times 10^5$ |
| 67 | B-67 | ethyl methacrylate (93 g) 6-hydroxyhexamethylene methacrylate (7 g) | ethylene glycol dimethacrylate (0.8 g) | $2.0 \times 10^5$ |
| 68 | B-68 | ethyl methacrylate (90 g) 2-cyanoethyl methacrylate (10 g) | ethylene glycol dimethacrylate (0.8 g) | $1.8 \times 10^5$ |

SYNTHESIS EXAMPLE 69 OF RESIN (B)

Synthesis of Resin B-69

A mixture of 99 g of ethyl methacrylate, 1 g of ethylene glycol dimethacrylate, 150 g of toluene, and 50 g of methanol was heated to 70° C. in a nitrogen stream, and 1.0 g of 4,4'-azobis(4-cyanopentanoic acid) was added thereto to conduct a reaction for 8 hours. The resulting copolymer (B-69) had a weight average molecular weight of $1.0 \times 10^5$.

SYNTHESIS EXAMPLES 70 TO 73 OF RESIN (B)

Synthesis of Resins B-70 to B-73

Resins (B) shown in Table 10 were prepared in the same manner as in Synthesis Example 69 of Resin (B), except for replacing 4,4'-azobis(4-cyanopentanoic acid) used as a polymerization initiator with each of the compounds shown in Table 10. The resulting resins had a weight average molecular weight of from $1.0 \times 10^5$ to $3 \times 10^5$.

TABLE 10

R—N=N—R

| Synthesis Example No. | Resin (B) | Polymerization Initiator | R— |
|---|---|---|---|
| 70 | B-70 | 2,2'-azobis(2-cyanopropanol) | HO—CH$_2$—C(CH$_3$)(CN)— |
| 71 | B-71 | 2,2'-azobis(2-cyanopentanol) | HOCH$_2$CH$_2$CH$_2$—C(CH$_3$)(CN)— |
| 72 | B-72 | 2,2'-azobis[2-methyl-N-(2-hydroxyethyl)-propionamide] | HOCH$_2$CH$_2$NH—C(=O)—C(CH$_3$)$_2$— |
| 73 | B-73 | 2,2'-azobis{2-methyl-N-[1,1-bis-hydroxymethyl)-2-hydroxyethyl]-propionamide} | (HOCH$_2$)(HOH$_2$C)(HOCH$_2$)C—NH—C(=O)—C(CH$_3$)— |

SYNTHESIS EXAMPLE 74 OF RESIN (B)

Synthesis of Resin B-74

A mixture of 99 g of ethyl methacrylate, 1.0 g of thioglycolic acid, 2.0 g of divinylbenzene, and 200 g of toluene was heated to 80° C. with stirring in a nitrogen stream. To the mixture was added 0.8 g of ACHN to conduct a reaction for 4 hours. Then, 0.4 g of ACHN was added thereto to conduct a reaction for 2 hours, and 0.2 g of ACHN was further added thereto to conduct a reaction for 2 hours. The resulting polymer (B-74) had a weight average molecular weight of $1.2 \times 10^5$.

SYNTHESIS EXAMPLES 75 TO 87 OF RESIN (B)

Synthesis of Resins B-75 to B-87

Resins (B) shown in Table 11 were prepared in the same manner as in Synthesis Example 74 of Resin (B), except for replacing 2.0 g of divinylbenzene used as a crosslinking polyfunctional monomer with the polyfunctional monomer or oligomer shown in Table 11.

TABLE 11

| Synthesis Example No. | Resin (B) | Crosslinking Monomer or Oligomer | Mw |
|---|---|---|---|
| 75 | B-75 | ethylene glycol dimethacrylate (2.5 g) | $2.2 \times 10^5$ |
| 76 | B-76 | diethylene glycol dimethacrylate (3 g) | $2.0 \times 10^5$ |
| 77 | B-77 | vinyl methacrylate (6 g) | $1.8 \times 10^5$ |
| 78 | B-78 | isopropenyl methacrylate (6 g) | $2.0 \times 10^5$ |
| 79 | B-79 | divinyl adipate (10 g) | $1.0 \times 10^5$ |
| 80 | B-80 | diallyl glutaconate (10 g) | $9.5 \times 10^5$ |
| 81 | B-81 | IPS-22GA (produced by Okamura Seiyu K. K.) (5 g) | $1.5 \times 10^5$ |
| 82 | B-82 | triethylene glycol diacrylate (2 g) | $2.8 \times 10^5$ |
| 83 | B-83 | trivinylbenzene (0.8 g) | $3.0 \times 10^5$ |
| 84 | B-84 | polyethylene glycol #400 diacrylate (3 g) | $2.5 \times 10^5$ |
| 85 | B-85 | polyethylene glycol dimethacrylate (3 g) | $2.5 \times 10^5$ |
| 86 | B-86 | trimethylolpropane triacrylate (0.5 g) | $1.8 \times 10^5$ |
| 87 | B-87 | polyethylene glycol #600 diacrylate (3 g) | $2.8 \times 10^5$ |

SYNTHESIS EXAMPLES 88 TO 95

Synthesis of Resins B-88 to B-95

A mixture of 39 g of methyl methacrylate, 60 g of ethyl methacrylate, 1.0 g of each of the mercapto compounds shown in Table 12 below, 2 g of ethylene glycol dimethacrylate, 150 g of toluene, and 50 g of methanol was heated to 70° C. in a nitrogen stream. To the mixture was added 0.8 g of AIBN was added to conduct a reaction for 4 hours. Then, 0.4 g of AIBN was further added thereto to conduct a reaction for 4 hours. The resulting polymers had a weight average molecular weight of from $9.5 \times 10^4$ to $2 \times 10^5$.

TABLE 12

| Synthesis Example No. | Resin (B) | Mercapto Compound |
|---|---|---|
| 88 | B-88 | CH$_2$COOH \| HSCHCOOH |

TABLE 12-continued

Synthesis Example

| No. | Resin (B) | Mercapto Compound |
|---|---|---|
| 89 | B-89 | HS—C₆H₄—COOH (2-mercaptobenzoic acid) |
| 90 | B-90 | $HSCH_2CH_2NH_2$ |
| 91 | B-91 | $HSCH_2CH_2O\text{—}P(=O)(OH)_2$ |
| 92 | B-92 | $HSCH_2CH_2O\text{—}P(=O)(OH)(OC_2H_5)$ |
| 93 | B-93 | $HSCH_2CH_2OCO\text{—}C_6H_4\text{—}$(phthalic anhydride ester) |
| 94 | B-94 | $HSCH_2CH_2COOH$ |
| 95 | B-95 | $HSCH_2CH_2SO_3H \cdot N\text{-pyridine}$ |
| 96 | B-96 | $HSCH_2CH_2NHCO(CH_2)_3COOH$ |
| 97 | B-97 | $HSCH_2CH_2N(CH_3)_2$ |
| 98 | B-98 | $HSCH_2CH_2OH$ |

EXAMPLE 1

A mixture of 6 g (solid basis, hereinafter the same) of (A-1) obtained in Synthesis Example 1 of Resin (A), 34 g (solid basis, hereinafter the same) of B-1 obtained in Synthesis Example of 1 of Resin (B), 200 g of zinc oxide, 0.15 g of heptamethinecyanine dye (I) shown below, 0.05 g of phthalic anhydride, and 300 g of toluene was dispersed in a ball mill for 2 hours to prepare a coating composition for a photoconductive layer. The coating composition was coated on paper, rendered electrically conductive, with a wire bar to a dry thickness of 18 g/m², followed by drying at 110° C. for 1 minute. The coating was allowed to stand in a dark place at 20° C. and 65% RH (relative humidity) for 24 hours to prepare an electrophotographic light-sensitive material.

Cyanine Dye (I):

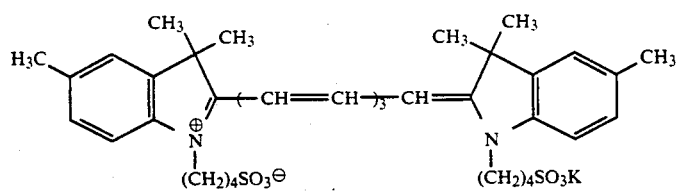

EXAMPLE 2

An electrophotographic light-sensitive material was produced in the same manner as in Example 1, except for replacing 34 g of B-1 with the same amount of B-25.

COMPARATIVE EXAMPLE A

An electrophotographic light-sensitive material was produced in the same manner as in Example 1, except for replacing 6 g of A-1 and 34 g of B-1 with 40 g of A-1.

COMPARATIVE EXAMPLE B

An electrophotographic light-sensitive material was produced in the same manner as in Comparative Example A, except for replacing 40 g of A-1 with 40 g of an ethyl methacrylate/acrylic acid copolymer (95/5 by weight) having a weight average molecular weight of 7,500 (hereinafter designated R-1).

COMPARATIVE EXAMPLE C

An electrophotographic light-sensitive material was produced in the same manner as in Comparative Example A, except for replacing 40 g of A-1 with 40 g of an ethyl methacrylate/acrylic acid copolymer (98.5/1.5 by weight) having a weight average molecular weight of 45,000.

COMPARATIVE EXAMPLE D

An electrophotographic light-sensitive material was produced in the same manner as in Example 1, except for replacing 6 g of A-1 with 6 g of R-1.

COMPARATIVE EXAMPLE E

An electrophotographic light-sensitive material was produced in the same manner as in Example 2, except for replacing 6 g of A-1 with 6 g of R-1.

Each of the light-sensitive materials obtained in Examples 1 and 2 and Comparative Examples A to E was evaluated for film properties in terms of surface smoothness and mechanical strength; electrostatic characteristics; image forming performance; oil-desensitivity when used as an offset master plate precursor (expressed in terms of contact angle with water after oil-desensitization treatment); and printing durability when used as an offset master plate according to the following test methods. The results obtained are shown in Table 13 below.

1) Smoothness of Photoconductive Layer

The smoothness (sec/cc) was measured using a Beck's smoothness tester manufactured by Kumayaga Riko K.K. under an air volume condition of 1 cc.

2) Mechanical Strength of Photoconductive Layer

The surface of the light-sensitive material was repeatedly (1000 times) rubbed with emery paper (#1000) under a load of 50 g/cm² using a Heidon 14 Model surface testing machine (manufactured by Shinto Kagaku K.K.). After dusting, the abrasion loss of the photoconductive layer was measured to obtain film retention (%).

3) Electrostatic Characteristics

The sample was charged with a corona discharge to a voltage of −6 kV for 20 seconds in a dark room at 20° C. and 65% RH using a paper analyzer "Paper Analyzer SP-428" manufactured by Kawaguchi Denki K.K. Ten seconds after the corona discharge, the surface potential $V_{10}$ was measured. The sample was allowed to stand in the dark for an additional 180 seconds, and the potential $V_{190}$ was measured. The dark decay retention (DRR; %), i.e., percent retention of potential after dark decay for 180 seconds, was calculated from the following equation:

$$DRR(\%) = (V_{190}/V_{10}) \times 100$$

The measurements were conducted under conditions of 20° C. and 65% RH (hereinafter referred to as Condition I) or 30° C. and 80% RH (hereinafter referred to as Condition II).

Separately, the sample was charged to −400 V with a corona discharge and then exposed to monochromatic light having a wavelength of 780 nm, and the time required for decay of the surface potential $V_{10}$ to one-tenth was measured to obtain an exposure $E_{1/10}$ (erg/cm²).

4) Image Forming Performance

After the sample was allowed to stand for one day under Condition I or II, each sample was charged to −5 kV and exposed to light emitted from a gallium-aluminum-arsenide semiconductor laser (oscillation wavelength: 780 nm; output: 2.8 mW) at an exposure amount of 64 erg/cm² (on the surface of the photoconductive layer) at a pitch of 25 μm and a scanning speed of 300 m/sec. The thus formed electrostatic latent image was developed with a liquid developer "ELP-T" produced by Fuji Photo Film Co., Ltd., followed by fixing. The reproduced image was visually evaluated for fog and image quality.

5) Contact Angle With Water

The sample was passed once through an etching processor using a n oil-desensitizing solution "ELP-E" produced by Fuji Photo Film Co., Ltd. to render the surface of the photoconductive layer oil-desensitive. On the thus oil-desensitized surface was placed a drop of 2 μl of distilled water, and the contact angle formed between the surface and water was measured using a goniometer.

6) Printing Durability

The sample was processed in the same manner as described in 4) above, and the surface of the photoconductive layer was subjected to oil-desensitization under the same conditions as in 5) above. The resulting lithographic printing plate was mounted on an offset printing machine "Oliver Model 52", manufactured by Sakurai Seisakusho K.K., and printing was carried out on fine paper. The number of prints obtained until background stains in the non-image areas appeared or the quality of the image areas was deteriorated was taken as the printing durability. The larger the number of the prints, the higher the printing durability.

7) Maximum Image Density ($D_{max}$)

The toner image density at the solid black portion was measured with a Macbeth reflection densitometer to obtain the maximum density ($D_{max}$).

TABLE 13

|  | Example 1 | Example 2 | Compa. Example A | Compa. Example B | Compa. Example C | Compa. Example D | Compa. Example E |
|---|---|---|---|---|---|---|---|
| Surface Smoothness (sec/cc) | 90 | 90 | 90 | 90 | 35 | 88 | 92 |
| Film Strength (%) | 85 | 93 | 63 | 65 | 65 | 85 | 90 |
| Electrostatic Characteristics: | | | | | | | |
| $V_{10}$ (−V): | | | | | | | |
| Condition I | 610 | 640 | 650 | 530 | 425 | 520 | 530 |
| Condition II | 600 | 610 | 640 | 450 | 300 | 465 | 480 |
| DRR (%): | | | | | | | |
| Condition I | 82 | 84 | 86 | 80 | 67 | 70 | 71 |
| Condition II | 80 | 81 | 85 | 70 | 35 | 43 | 48 |
| $E_{1/10}$ (erg/cm²): | | | | | | | |
| Condition I | 32 | 30 | 29 | 47 | 150 | 50 | 55 |
| Condition II | 33 | 30 | 30 | 53 | 80 | 54 | 53 |
| Image-Forming Performance: | | | | | | | |
| Condition I | Good | Good | Good | Good | Poor (scratches of fine letters or lines) | Good | Good |
| Condition II | Good | Good | Good | No good (reduced $D_{max}$) | Extremely poor (background fog, remarkable scratches of fine lines) | No good (reduced $D_{max}$) | No good (reduced $D_{max}$) |
| Contact Angle With Water (°) | 12 | 11 | 10 | 11 | 25-30 (widely scattered) | 12 | 12 |
| Printing Durability: | 8,000 | 10,000 or more | 3,000 | 3,000 | Background stains from the | 8,000 | 10,000 or more |

TABLE 13-continued

|  | Example 1 | Example 2 | Compa. Example A | Compa. Example B | Compa. Example C | Compa. Example D | Compa. Example E |
| --- | --- | --- | --- | --- | --- | --- | --- |
|  |  |  |  | start of printing |  |  |  |

As can be seen from the results of Table 13, each of the light-sensitive materials according to the present invention had satisfactory surface smoothness and electrostatic characteristics. When each was used as an offset master plate precursor, the reproduced image was clear and free from background stains in the non-image area. While the reason therefor has not been proven conclusively, these results appear to be due to sufficient adsorption of the binder resin onto the photoconductive particles and sufficient covering of the surface of the particles with the binder resin. For the same reason, oil-desensitization of the offset master plate precursor with an oil-desensitizing solution was sufficient to render the non-image areas sufficiently hydrophilic, as shown by a small contact angle of 20° or less with water. On practical printing using the resulting master plate, no background stains were observed in the prints.

The sample of Comparative Example A in which only resin (A) was employed had very satisfactory electrostatic characteristics, but when used as an offset master, the prints obtained from about the 3000th print suffered from a deterioration in image quality.

The sample of Comparative Example B has a reduced DRR for 180 seconds and an increased $E_{1/10}$.

The sample of Comparative Example C, in which a binder resin whose chemical structure is the same as the copolymer used in Comparative Example B but having an increased weight average molecular weight was used, underwent considerable deterioration of electrostatic characteristics. It is thus assumed that the binder resin having an increased molecular weight is adsorbed onto photoconductive particles but also induces agglomeration of the particles to exert adverse influences on electrostatic characteristics.

The samples of Comparative Examples D and E show improvements in electrostatic characteristics over that of Comparative Example C but were still inferior to the light-sensitive materials of the present invention. In particular, the electrostatic characteristics of these samples are subject to considerable fluctuation with changes of environmental conditions. Actually, the reproduced image formed by using these samples suffered from deterioration when processed under high-temperature and high-humidity conditions.

From all these considerations, it is thus clear that an electrophotographic light-sensitive material satisfying both requirements of electrostatic characteristics and printing suitability cannot be obtained without the binder resin according to the present invention.

EXAMPLES 3 TO 26

An electrophotographic light-sensitive material was prepared in the same manner as in Example 1, except for replacing A-1 and B-1 with each of the resins (A) and (B) shown in Table 14, respectively.

The performance properties of the resulting light-sensitive materials were evaluated in the same manner as in Example 1, and the results obtained are shown in Table 14 below. The electrostatic characteristics in Table 14 are those determined under Condition II (30° C., 80% RH).

TABLE 14

| Example No. | Resin (A) | Resin (B) | $V_{10}$ (−V) | DRR (%) | $E_{1/10}$ (erg/cm$^2$) | Printing Durability |
| --- | --- | --- | --- | --- | --- | --- |
| 3 | A-2 | B-2 | 610 | 80 | 33 | 8000 |
| 4 | A-3 | B-2 | 630 | 83 | 30 | 8000 |
| 5 | A-4 | B-4 | 630 | 85 | 25 | 8000 |
| 6 | A-6 | B-4 | 600 | 80 | 30 | 8000 |
| 7 | A-7 | B-5 | 565 | 78 | 45 | 8500 |
| 8 | A-8 | B-6 | 590 | 80 | 32 | 8000 |
| 9 | A-9 | B-7 | 580 | 80 | 30 | 8500 |
| 10 | A-10 | B-7 | 565 | 80 | 33 | 8500 |
| 11 | A-11 | B-8 | 620 | 83 | 27 | 8000 |
| 12 | A-13 | B-9 | 580 | 80 | 31 | 8000 |
| 13 | A-15 | B-10 | 585 | 81 | 30 | 8500 |
| 14 | A-17 | B-13 | 580 | 79 | 33 | 8000 |
| 15 | A-20 | B-15 | 600 | 81 | 29 | 8000 |
| 16 | A-21 | B-9 | 590 | 80 | 29 | 8000 |
| 17 | A-22 | B-19 | 570 | 78 | 35 | 8300 |
| 18 | A-23 | B-20 | 575 | 85 | 26 | 10000 or more |
| 19 | A-24 | B-21 | 560 | 79 | 35 | 10000 or more |
| 20 | A-25 | B-22 | 550 | 75 | 38 | 10000 or more |
| 21 | A-7 | B-31 | 560 | 80 | 30 | 10000 or more |
| 22 | A-9 | B-34 | 580 | 81 | 30 | 10000 or more |
| 23 | A-15 | B-38 | 590 | 82 | 30 | 10000 or more |
| 24 | A-17 | B-39 | 590 | 83 | 31 | 10000 or more |
| 25 | A-23 | B-40 | 585 | 85 | 30 | 10000 or more |
| 26 | A-16 | B-43 | 565 | 78 | 34 | 10000 |

TABLE 14-continued

| Example No. | Resin (A) | Resin (B) | $V_{10}$ (−V) | DRR (%) | $E_{1/10}$ (erg/cm$^2$) | Printing Durability |
|---|---|---|---|---|---|---|
| | | | | | | or more |

It can be seen from the results in Table 14 that each of the light-sensitive materials according to the present invention was satisfactory in all aspects of photoconductive layer surface smoothness, film strength, electrostatic characteristics, and printing suitability.

EXAMPLES 27 TO 45

A mixture of 6.5 g of each of resins (A) shown in Table 15 below, 33.5 g of each of resins (B) shown in Table 15, 200 g of zinc oxide, 0.05 g of Rose Bengale, 0.03 g of Bromophenol Blue, 0.02 g of uranine, 0.1 g of phthalic anhydride, and 240 g of toluene was dispersed in a ball mill for 2 hours. The resulting coating composition was coated on paper, rendered conductive, with a wire bar to a dry thickness of 20 g/m$^2$, followed by heating at 110° C. for 30 seconds. The coating was allowed to stand in a dark place at 20° C. and 65% RH for 24 hours to obtain an electrophotographic light-sensitive material.

The resulting light-sensitive materials were evaluated in the same manner as in Example 1 with the following exceptions. In the evaluation of electrostatic characteristics, photosensitivity [$E_{1/10}$ (lux.sec)] was determined by charging the surface of the photoconductive layer with a corona discharge to −400 V, exposing the photoconductive layer to visible light of 2.0 lux, and measuring the time required for decreasing the surface potential ($V_{10}$) to 1/10. In the evaluation of image forming performance, the sample as a printing plate precursor was processed to form a toner image using an automatic plate making machine "ELP 404V" (manufactured by Fuji Photo Film Co., Ltd.) using a toner "ELP-T" (produced by Fuji Photo Film Co., Ltd.). The results obtained are shown in Table 15. The electrostatic characteristics in Table 15 are those determined under Condition II (30° C., 80% RH).

TABLE 15

| Example No. | Resin (A) | Resin (B) | $V_{10}$ (−V) | DRR (%) | $E_{1/10}$ (lux · sec) | Printing Durability |
|---|---|---|---|---|---|---|
| 27 | A-1 | B-2 | 555 | 83 | 8.6 | 8000 |
| 28 | A-2 | B-4 | 555 | 82 | 9.0 | " |
| 29 | A-7 | B-5 | 545 | 76 | 10.8 | " |
| 30 | A-11 | B-6 | 580 | 85 | 7.6 | " |
| 31 | A-12 | B-7 | 575 | 84 | 8.0 | 8500 |
| 32 | A-14 | B-7 | 550 | 84 | 8.3 | " |
| 33 | A-16 | B-10 | 545 | 80 | 9.2 | " |
| 34 | A-18 | B-12 | 540 | 77 | 11.0 | 8000 |
| 35 | A-19 | B-14 | 575 | 80 | 10.3 | " |
| 36 | A-20 | B-17 | 560 | 80 | 9.8 | " |
| 37 | A-21 | B-18 | 555 | 78 | 10.0 | 8500 |
| 38 | A-22 | B-23 | 545 | 79 | 10.2 | 10000 or more |
| 39 | A-23 | B-48 | 560 | 85 | 8.0 | 10000 or more |
| 40 | A-24 | B-2 | 550 | 78 | 10.5 | 8000 |
| 41 | A-25 | B-4 | 555 | 80 | 9.5 | " |
| 42 | A-20 | B-20 | 565 | 82 | 9.3 | 10000 or more |
| 43 | A-21 | B-21 | 560 | 80 | 9.7 | 10000 or more |
| 44 | A-23 | B-22 | 570 | 86 | 8.3 | 10000 or more |
| 45 | A-24 | B-47 | 550 | 75 | 11.0 | 10000 or more |

As is apparent from the results in Table 15, each of the light-sensitive materials according to the present invention had excellent charging properties, dark charge retention, and photosensitivity, and provided a clear reproduced image free from background fog even when processed under severe conditions of high temperature and high humidity (30° C. 80% RH).

When printing was carried out using an offset master plate produced from each of the light-sensitive materials, clear prints of high quality could be obtained up to the number of prints indicated in Table 15.

EXAMPLE 46

A mixture of 6 g of A-26 prepared in Synthesis Example 26 of Resin (A), 34 g of B-50 prepared in Synthesis Example 50 of Resin (B), 200 g of zinc oxide, 0.02 g of heptamethinecyanine dye (II) shown below, 0.15 g of phthalic anhydride, and 300 g of toluene was dispersed in a ball mill for 3 hours to prepare a coating composition for a photoconductive layer. The resulting coating composition was coated on paper, rendered conductive, with a wire bar to a dry thickness of 18 g/m$^2$, followed by drying at 110° C. for 1 minute. The coating was then allowed to stand in a dark plate at 20° C. and 65% RH for 24 hours to prepare an electrophotographic light-sensitive material.

Cyanine Dye (II):

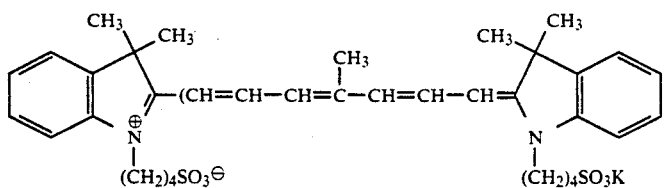

EXAMPLE 47

An electrophotographic light-sensitive material was prepared in the same manner as in Example 46, except for replacing B-50 with the same amount of B-69.

COMPARATIVE EXAMPLE F

An electrophotographic light-sensitive material was prepared in the same manner as in Example 46, except for replacing 6 g of A-26 and 34 g of B-50 with 40 g of A-26.

COMPARATIVE EXAMPLE G

An electrophotographic light-sensitive material was prepared in the same manner as in Comparative Example F, except for replacing 40 g of A-26 with 40 g of R-1 used in Comparative Example B.

COMPARATIVE EXAMPLE H

An electrophotographic light-sensitive material was prepared in the same manner as in Comparative Example F, except for replacing 40 g of A-26 with 40 g of R-2 used in Comparative Example C.

COMPARATIVE EXAMPLE I

An electrophotographic light-sensitive material was prepared in the same manner as in Example 46, except for replacing 6 g of A-26 with 6 g of R-1.

COMPARATIVE EXAMPLE J

An electrophotographic light-sensitive material was prepared in the same manner as in Example 47, except for replacing 6 g of A-26 with 6 of R-1.

Each of the light-sensitive materials obtained in Examples 46 and 47 and Comparative Examples F to J was evaluated in the same manner as in Example 1, and the results obtained are shown in Table 16.

TABLE 16

|  | Example 46 | Example 47 | Compa. Example F | Compa. Example G | Compa. Example H | Compa. Example I | Compa. Example J |
|---|---|---|---|---|---|---|---|
| Surface Smoothness (sec/cc) | 110 | 115 | 120 | 115 | 45 | 110 | 110 |
| Film Strength (%) | 90 | 97 | 70 | 65 | 80 | 90 | 96 |
| Electrostatic Characteristics: | | | | | | | |
| $V_{10}(-V)$: | | | | | | | |
| Condition I | 560 | 570 | 630 | 510 | 410 | 510 | 515 |
| Condition II | 550 | 565 | 625 | 475 | 300 | 480 | 490 |
| DRR (%): | | | | | | | |
| Condition I | 85 | 86 | 88 | 75 | 65 | 70 | 73 |
| Condition II | 80 | 85 | 86 | 64 | 35 | 60 | 65 |
| $E_{1/10}$ (erg/cm$^2$): | | | | | | | |
| Condition I | 32 | 29 | 28 | 48 | 120 | 53 | 52 |
| Condition II | 33 | 30 | 28 | 55 | 200 or more | 60 | 60 |
| Image-Forming Performance: | | | | | | | |
| Condition I | Good | Good | Good | No good to good (reduced $D_{max}$) | Poor (scratches of fine letters or lines) | No good to good (reduced $D_{max}$) | No good to good (reduced $D_{max}$) |
| Condition II | Good | Good | Good | No good (reduced $D_{max}$, slight background fog) | Extremely poor (background fog, remarkable scratches of fine lines) | No good to poor (background fog, (reduced $D_{max}$) | No good (background fog, reduced $D_{max}$) |
| Contact Angle With Water (°) | 10 or less | 10 or less | 10 or less | 12 | 25-30 (widely scattered) | 11 | 12 |
| Printing Durability: | 8,000 | 10,000 or more | 1,000 | 1,000 | Background stains from the start of printing | 8,000 | 10,000 or more |

As can be seen from the results of Table 16, each of the light-sensitive materials according to the present invention had satisfactory surface smoothness and electrostatic characteristics and provided a clear reproduced image free from background stains. While not bound to the following theory, these results appear to be due to sufficient adsorption of the binder resin onto the photoconductive particles and sufficient covering of the surface of the particles with the binder resin. For the same reason, oil-desensitization of the offset master plate precursor with an oil-desensitizing solution was sufficient to render the non-image areas sufficiently hydrophilic, as shown by a small contact angle of 10° or less with water. On practical printing using the resulting master plate, no background stains were observed in the prints.

The sample of Comparative Example F in which only resin (A) was employed had very satisfactory electrostatic characteristics, but when used as an offset master, The performance properties of the resulting light-sensitive materials were evaluated in the same manner as in Example 1, and the results obtained are shown in Table 17 below. The electrostatic characteristics in Table 14 are those determined under Condition II (30° C., 80% RH).

TABLE 17

| Example No. | Resin (A) | Resin (B) | $V_{10}$ (−V) | DRR (%) | $E_{1/10}$ (erg/cm$^2$) | Printing Durability |
|---|---|---|---|---|---|---|
| 48 | A-27 | B-51 | 550 | 83 | 41 | 8000 |
| 49 | A-28 | B-51 | 575 | 86 | 31 | 8000 |
| 50 | A-29 | B-53 | 580 | 85 | 39 | 8000 |
| 51 | A-31 | B-53 | 550 | 80 | 45 | 8000 |
| 52 | A-32 | B-54 | 555 | 82 | 42 | 8500 |
| 53 | A-33 | B-55 | 555 | 83 | 38 | 8000 |
| 54 | A-34 | B-56 | 555 | 84 | 37 | 8500 |
| 55 | A-35 | B-56 | 575 | 85 | 30 | 8500 |
| 56 | A-36 | B-57 | 550 | 81 | 44 | 8000 |
| 57 | A-38 | B-58 | 555 | 83 | 39 | 8000 |
| 58 | A-40 | B-59 | 545 | 79 | 42 | 8000 |
| 59 | A-42 | B-62 | 570 | 85 | 32 | 8000 |
| 60 | A-45 | B-64 | 565 | 85 | 32 | 8000 |
| 61 | A-47 | B-66 | 580 | 85 | 28 | 8500 |
| 62 | A-26 | B-68 | 555 | 82 | 40 | 8500 |
| 63 | A-28 | B-69 | 580 | 85 | 29 | 10000 or more |
| 64 | A-29 | B-70 | 585 | 85 | 36 | 10000 or more |
| 65 | A-33 | B-73 | 580 | 88 | 36 | 9000 |
| 66 | A-35 | B-75 | 580 | 86 | 32 | 9000 |
| 67 | A-37 | B-83 | 575 | 86 | 29 | 1000 or more |
| 68 | A-40 | B-87 | 555 | 82 | 39 | 1000 or more |
| 69 | A-43 | B-88 | 570 | 85 | 28 | 1000 or more |
| 70 | A-48 | B-89 | 555 | 83 | 38 | 1000 or more |
| 71 | A-46 | B-92 | 570 | 85 | 28 | 1000 or more | image quality of the prints was deteriorated from about the 1000th print.

The sample of Comparative Example G had a reduced DRR for 180 seconds and an increased $E_{1/10}$.

The sample of Comparative Example H, in which a binder resin whose chemical structure is the same as the copolymer used in Comparative Example G but having an increased weight average molecular weight was used, underwent considerable deterioration of electrostatic characteristics. It is thus assumed that the binder resin having an increased molecular weight is adsorbed onto photoconductive particles but also induces agglomeration of the particles to exert adverse influences on electrostatic characteristics.

The samples of Comparative Examples I and J, in which a known low-molecular weight random copolymer was used in place of resin (A) of the present invention, had a deteriorated DRR and a deteriorated $E_{1/10}$.

From all these considerations, it is thus clear that an electrophotographic light-sensitive material satisfying both requirements of electrostatic characteristics and printing suitability cannot be obtained without the binder resin according to the present invention.

EXAMPLES 48 TO 71

An electrophotographic light-sensitive material was prepared in the same manner as in Example 46, except for replacing A-26 and B-50 with each of the resins (A) and (B) shown in Table 17, respectively.

EXAMPLES 72 TO 90

A mixture of 6.5 g of each of resins (A) shown in Table 18 below, 33.5 g of each of resins (B) shown in Table 18, 200 g of zinc oxide, 0.05 g of Rose Bengale, 0.03 g of Bromophenol Blue, 0.02 g of uranine, 0.30 g of phthalic anhydride, and 240 g of toluene was dispersed in a ball mill for 3 hours. The resulting coating composition was coated on paper, rendered conductive, with a wire bar to a dry thickness of 20 g/m$^2$, followed by heating at 110° C. for 30 seconds. The coating was allowed to stand in a dark place at 20° C. and 65% RH for 24 hours to obtain an electrophotographic light-sensitive material.

The resulting light-sensitive materials were evaluated in the same manner as in Example 1 with the following exceptions. In the evaluation of electrostatic characteristics, photosensitivity [$E_{1/10}$ (lux.sec)] was determined by charging the surface of the photoconductive layer with a corona discharge to −400 V, exposing the photoconductive layer to visible light of 2.0 lux, and measuring the time required for decreasing the surface potential ($V_{10}$) to 1/10. In the evaluation of image forming performance, the sample as a printing plate precursor was processed to form a toner image using an automatic plate making machine "ELP 404V" (manufactured by Fuji Photo Film Co., Ltd.) using a toner "ELP-T" (produced by Fuji Photo Film Co., Ltd.). The results obtained are shown in Table 18. The electrostatic characteristics in Table 18 are those determined under Condition II (30° C., 80% RH).

TABLE 18

| Example No. | Resin (A) | Resin (B) | $V_{10}$ (−V) | DRR (%) | $E_{1/10}$ (lux·sec) | Printing Durability |
|---|---|---|---|---|---|---|
| 72 | A-26 | B-51 | 560 | 92 | 9.8 | 8000 |
| 73 | A-27 | B-53 | 560 | 90 | 10.2 | " |
| 74 | A-32 | B-54 | 550 | 88 | 11.3 | " |
| 75 | A-36 | B-55 | 550 | 88 | 10.6 | " |
| 76 | A-38 | B-56 | 555 | 89 | 10.5 | 8500 |
| 77 | A-39 | B-56 | 560 | 91 | 10.0 | " |
| 78 | A-41 | B-59 | 555 | 90 | 10.4 | " |
| 79 | A-30 | B-61 | 550 | 89 | 10.8 | 8000 |
| 80 | A-31 | B-63 | 560 | 90 | 10.9 | " |
| 81 | A-34 | B-66 | 565 | 92 | 9.6 | " |
| 82 | A-26 | B-69 | 625 | 93 | 10.5 | 10000 or more |
| 83 | A-31 | B-72 | 550 | 90 | 11.4 | 9000 |
| 84 | A-38 | B-96 | 560 | 92 | 10.5 | 10000 or more |
| 85 | A-43 | B-51 | 570 | 93 | 10.5 | 8000 |
| 86 | A-44 | B-53 | 555 | 89 | 9.9 | " |
| 87 | A-45 | B-69 | 565 | 92 | 9.8 | 10000 or more |
| 88 | A-46 | B-74 | 570 | 90 | 10.0 | 10000 or more |
| 89 | A-48 | B-91 | 550 | 88 | 10.8 | 10000 or more |
| 90 | A-49 | B-93 | 550 | 86 | 11.6 | 10000 or more |

It can be seen from the results in Table 18 that each of the light-sensitive materials according to the present invention had excellent charging properties, dark charge retention and photosensitivity and provided a clear image free from background fog even when processed under severe conditions of high temperature and high humidity (30° C., 80% RH).

When printing was carried out using an offset master plate produced from the light-sensitive material, prints having clear image quality could be obtained up the number of prints shown in Table 18 above.

As described above, the present invention provides an electrophotographic light-sensitive material having excellent electrostatic characteristics and mechanical strength.

While the invention has been described in detail and with reference to specific embodiments thereof, it will be apparent to one skilled in the art that various changes and modifications can be made therein without departing from the spirit and scope thereof.

What is claimed is:

1. An electrophotographic light-sensitive material comprising a support having thereon a photoconductive layer containing at least inorganic photoconductive particles and a binder resin, wherein the binder resin contains (A) at least one resin comprising a graft copolymer having a weight average molecular weight of from $1.0 \times 10^3$ to $2.0 \times 10^4$ and containing, as a copolymer component, at least one of polyester type macromonomers having a weight average molecular weight of from $1.0 \times 10^3$ to $1.5 \times 10^4$ and represented by following formulae (I), (II), (II), and (IV):

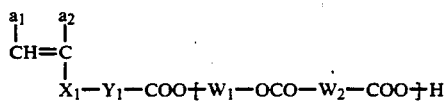
(I)

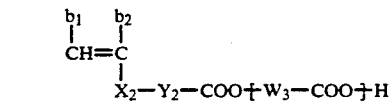
(II)

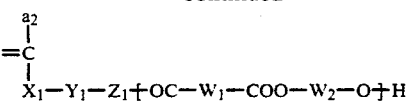
(III)

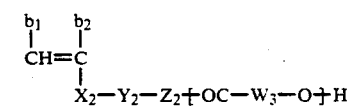
(IV)

wherein the brackets [ ] represents a recurring unit; $a_1$ and $a_2$, which may be the same or different, each represents hydrogen atom, a halogen atom, a cyano group, a hydrocarbon group having from 1 to 8 carbon atoms, —COO—Z, or —COO—Z bonded through a hydrocarbon group having from 1 to 8 carbon atoms (wherein Z represents a hydrocarbon group having from 1 to 18 carbon atoms); $X_1$ represents a bond, —COO—, —OCO—,

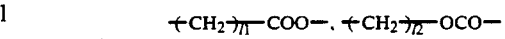

(wherein l1 and l2 each represents an integer, of from 1 to 3),

(wherein $P_1$ represents a hydrogen atom or a hydrocarbon group having from 1 to 12 carbon atoms), —CONHCONH—, —CONHCOO—, —O—,

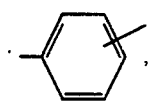

or —SO$_2$—; $Y_1$ represents a bond or a group linking $X_1$ and —COO— or a group linking $X_1$ and $Z_1$; $Z_1$ represents a bond, or —CH$_2$—, —O—, or —NH—; $W_1$ and W₂, which may be the same or different, each represents a divalent aliphatic group, a divalent aromatic group (each of the aforesaid groups may have in the bond of the divalent organic residue at least one bond group selected from —O—, —S—,

(wherein P₂ represents a hydrogen atom or a hydrocarbon group having from 1 to 12 carbon atoms), —SO₂—, —COO—, —OCO—, —CONHCO—, —NHCONH—,

(wherein P₃ has the same meaning as P₂),

(wherein P₄ has the same meaning as P₂), and

or an organic residue composed of a combination of these residues; W₃ represents a divalent aliphatic group; b₁ and b₂ have the same meaning as a₁ and a₂; X₂ has the same meaning as X₁; Y₂ has the same meaning as Y₁; and Z₂ has the same meaning as Z₁, and (B) at least one resin having a weight average molecular weight of 5×10⁴ or more, containing a recurring unit represented by the following formula (VI) as a copolymer component, and having a crosslinked structure:

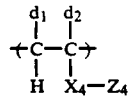 (VI)

wherein X₄ represents —COO—, —OCO—, —CH₂OCO—, —CH₂COO—, —O—, or —SO₂—; Z₄ represents a hydrocarbon group having from 1 to 22 carbon atoms; and d₁ and d₂, which may be the same or different, each represents a hydrogen atom, a halogen atom, a cyano group, a hydrocarbon group having from 1 to 8 carbon atoms, —COO—Z', or —COO—Z' bonded through a hydrocarbon group having from 1 to 8 carbon atoms, wherein Z' represents a hydrocarbon group having from 1 to 18 carbon atoms.

2. An electrophotographic light-sensitive material as claimed in claim 1, wherein said graft copolymer in resin (A) has at least one polar group selected from the group consisting of —PO₃H₂, —SO₃H, —COOH, —OH,

(wherein R represents a hydrocarbon group or —OR₀, wherein R₀ represents a hydrocarbon group), and a cyclic acid anhydride group-containing group at one terminal of the main chain thereof.

3. An electrophotographic light-sensitive as claimed in claim 1, wherein said resin (B) has at least one polar group selected from the group consisting of —PO₃H₂, —SO₃H, —COOH, —OH, —SH,

(wherein R' represents a hydrocarbon group or —OR₀', wherein R₀' represents a hydrocarbon group), a cyclic acid anhydride group-containing group, —CHO, —CONH₂, —SO₂NH₂, and

(wherein g₁ and g₂, which may be the same or different, each represents a hydrogen atom or a hydrocarbon group) at one terminal of at least one polymer main chain thereof.

4. An electrophotographic light-sensitive as claimed in claim 2, wherein said resin (B) has at least one polar group selected from the group consisting of —PO₃H₂, —SO₃H, —COOH, —OH, —SH,

(wherein R' represents a hydrocarbon group or —OR₀', wherein R₀' represents a hydrocarbon group), a cyclic acid anhydride group-containing group, —CHO, —CONH₂, —SO₂NH₂, and

(wherein g₁ and g₂, which may be the same or different, each represents a hydrogen atom or a hydrocarbon group) at one terminal of at least one polymer main chain thereof.

5. An electrophotographic light-sensitive material as claimed in claim 2, wherein said resin (B) contains, as a polymer component, no recurring unit having the acidic group or cyclic acid anhydride-containing group which is present in resin (A).

6. An electrophotographic light-sensitive material as claimed in claim 4, wherein said resin (B) contains, as a polymer component, no recurring unit having the acidic group or cyclic acid anhydride-containing group which is present in resin (A).

7. An electrophotographic light-sensitive material as claimed in claim 1, wherein said graft copolymer in resin (A) further contains, as a copolymer component, from 30 to 96.5% by weight of a monomer represented by formula (V):

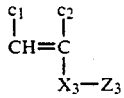

wherein $c_1$ and $c_2$ have the same meaning as $a_1$ and $a_2$; $X_3$ represents —COO—, —OCO— or —O—; and $Z_3$ represents a hydrocarbon group having from 1 to 18 carbon atoms.

8. An electrophotographic light-sensitive material as claimed in claim 1, wherein the macromonomer unit constitutes from 3 to 60% by weight of resin (A).

* * * * *